US012787991B2

(12) United States Patent
Kawasaki et al.

(10) Patent No.: US 12,787,991 B2
(45) Date of Patent: Nov. 10, 2026

(54) LURE WITH A HOLLOW PORTION COMPRISING A SWINGING OSCILLATING WEIGHT OR SIMILAR

(71) Applicant: Shimano Inc., Osaka (JP)

(72) Inventors: Tatsurou Kawasaki, Osaka (JP); Kenji Hirahara, Osaka (JP); Almir Akira Inada, Osaka (JP); Tadasuke Nakamichi, Osaka (JP); Sadahiro Tsuboi, Osaka (JP); Yoshiyuki Takemoto, Osaka (JP)

(73) Assignee: Shimano Inc., Osaka (JP)

( * ) Notice: Subject to any disclaimer, the term of this patent is extended or adjusted under 35 U.S.C. 154(b) by 183 days.

(21) Appl. No.: 18/075,258

(22) Filed: Dec. 5, 2022

(65) Prior Publication Data

US 2023/0189776 A1 Jun. 22, 2023

(30) Foreign Application Priority Data

Dec. 17, 2021 (JP) ................................ 2021-205567
Sep. 16, 2022 (JP) ................................ 2022-148233
Oct. 25, 2022 (JP) ................................ 2022-170608

(51) Int. Cl.
*A01K 85/16* (2006.01)
*A01K 85/00* (2006.01)

(52) U.S. Cl.
CPC .......... *A01K 85/16* (2013.01); *A01K 85/1837* (2022.02); *A01K 85/1847* (2022.02)

(58) Field of Classification Search
CPC ............ A01K 85/1841; A01K 85/1847; A01K 85/1837; A01K 85/16
See application file for complete search history.

(56) References Cited

U.S. PATENT DOCUMENTS

| | | | | |
|---|---|---|---|---|
| 2,541,397 A * | 2/1951 | Wisener | A01K 85/16 | 43/42.19 |
| 2,560,733 A * | 7/1951 | Morris | A01K 85/16 | 43/42.12 |
| 2,741,056 A * | 4/1956 | Sullivan | A01K 85/16 | 43/42.31 |
| 4,287,679 A * | 9/1981 | Klotz | A01K 85/16 | 43/42.22 |
| 6,581,320 B1 * | 6/2003 | Hnizdor | A01K 85/16 | 43/42.35 |
| 6,671,996 B1 * | 1/2004 | Ito | A01K 85/16 | 43/42.31 |
| 6,789,347 B1 * | 9/2004 | West | A01K 85/01 | 43/17.1 |
| 11,197,469 B2 * | 12/2021 | Choi | A01K 85/00 | |
| 2002/0073600 A1 * | 6/2002 | West | A01K 85/01 | 43/17.1 |

(Continued)

FOREIGN PATENT DOCUMENTS

| | | |
|---|---|---|
| JP | 2002-330668 A | 11/2002 |
| JP | 2011-30461 A | 2/2011 |
| JP | 2012-044963 A | 3/2012 |

*Primary Examiner* — Jessica B Wong
(74) *Attorney, Agent, or Firm* — Spencer Fane, LLP

(57) ABSTRACT

A lure includes a body having an interior hollow portion, a weight configured to move in the hollow portion, and a support member having a guide portion extending in a longitudinal direction of the body so as to guide the weight and be capable of oscillating inside the hollow portion.

20 Claims, 32 Drawing Sheets

(56) References Cited

U.S. PATENT DOCUMENTS

| | | | | |
|---|---|---|---|---|
| 2002/0104250 | A1* | 8/2002 | West | A01K 85/01<br>43/17.1 |
| 2010/0126058 | A1* | 5/2010 | Hughes | A01K 85/16<br>43/42.47 |
| 2016/0000057 | A1* | 1/2016 | Mistilis | A01K 85/01<br>43/42.12 |
| 2016/0309687 | A1* | 10/2016 | Ito | A01K 85/00 |
| 2017/0156299 | A1* | 6/2017 | Reyment | A01K 85/18 |
| 2018/0249692 | A1* | 9/2018 | Choi | A01K 85/00 |
| 2019/0261614 | A1* | 8/2019 | Olsen | A01K 91/04 |
| 2019/0320634 | A1* | 10/2019 | Kawasaki | A01K 85/16 |
| 2021/0274762 | A1* | 9/2021 | Yagi | A01K 85/01 |
| 2021/0274763 | A1* | 9/2021 | Yagi | A01K 85/12 |
| 2021/0386043 | A1* | 12/2021 | Yamane | A01K 85/1837 |
| 2022/0061280 | A1* | 3/2022 | Nakamichi | A01K 85/01 |
| 2022/0378027 | A1* | 12/2022 | Kawasaki | A01K 85/1837 |

* cited by examiner

LURE WITH A HOLLOW PORTION COMPRISING A SWINGING OSCILLATING WEIGHT OR SIMILAR

CROSS-REFERENCE TO RELATED APPLICATIONS

This application claims priority to Japanese Patent Application Nos. 2021-205567, filed on Dec. 17, 2021, 2022-148233, filed on Sep. 16, 2022 and 2022-17608, filed on Oct. 25, 2022. The entire disclosure of Japanese Patent Application Nos. 2021-205567, 2022-148233 and 2022-17608 are hereby incorporated by reference.

BACKGROUND

Technical Field

The present disclosure relates to a lure.

Background Art

It has been difficult to make a conventional lure formed of plastic (resin material) that can move like a living fish when the lure is being pulled by a fishing line. Thus, for example, as disclosed in Japanese Laid-Open Patent Application Nos. 2002-330668, 2012-044963 and . 2011-030461, a weight that moves in a different direction than the direction in which the fishing line is pulling is placed in a hollow body to make the lure behave in a three-dimensional manner.

SUMMARY

However, even in the above-described conventional lures that include a weight inside the body, there are problems such as the restriction of the behavior of the weight, and not being able to obtain sufficient flight distance at the time of casting.

As a result, it has been determined that there is a demand for improved fishing results by increasing the uncertainty of the movement (swimming) of the lure, thereby making it possible to achieve both a behavior more similar to that of real fish and an increase in the flight distance of the lure.

The present disclosure was conceived in light of these circumstances, and an object of this disclosure is to provide a lure having behavior that more closely resembles a real fish and having an increased flight distance.

A lure according to the present disclosure comprises a body having a hollow portion inside, a weight that moves in the hollow portion, and a support member that has a guide portion extending in a longitudinal direction of the body so as to guide the weight and that oscillates inside the hollow portion.

By the lure of the present disclosure, a support member includes a guide portion that extends in a longitudinal direction and an oscillating weight that increases the uncertainty of the movement (swimming) of the lure and enables the behavior of the lure to more closely resemble that of a real fish. Further, by the lure of the present disclosure, since the weight oscillates together with the guide portion, the weight can be oscillated securely within the range of oscillation of the guide portion; thus, the behavior of the weight is not restricted by the guide portion. Further, since the weight is guided and moves only in the direction in which the guide portion extends, and the weight does not separate from the guide portion even when the guide portion oscillates, collisions between the weight and the body can be prevented.

Further, when the lure is cast, the centrifugal force acting on the weight causes the weight to be guided by the guide portion and move toward the end of the tail side that faces forward, thus increasing the flight distance.

In this manner, in the present disclosure, both realistic fish-like motion and increased flight distance can be achieved.

The body can have a restricting portion that restricts the range of oscillation of the support member.

In this case, the range of oscillation of the support member is set to an appropriate range since the oscillating support member contacts the restricting portion. Therefore, since the range of oscillation of the weight, which oscillates together with the support member, is also restricted, the weight, which oscillates in the hollow portion inside the body, can be prevented from contacting the body.

The support member oscillates in a plane that intersects the longitudinal direction.

In this case, the support member extending in the longitudinal direction can be oscillated smoothly and efficiently to realize the behavior of a real fish.

At least one end of the support member is connected to an inner surface of the body.

In this case, a part of the support member is connected to the inner surface of the body, and the support member can be arranged at a prescribed position in the hollow portion, so that the range of oscillation of the support member can be set within a certain range. That is, because the support member uniformly oscillates, the lure can be prevented from behaving unnaturally.

Further, only the parts of the support member that are not connected to the body can oscillate without oscillating the entire length of the support member. For example, in the hollow portion at the tail side of the fish-shaped body, where the body tapers and the cross section of the hollow portion of the body is smaller, one end of the support member can be connected to the inner surface of the body. Therefore, even if the support member oscillates in a part of the hollow portion with a small cross sectional area, the support member is prevented from contacting with the inner surface of the body.

The support member also includes a connecting portion that connects the guide portion to the body so as to be able to oscillate.

In this case, the guide portion can oscillate via the connecting portion that oscillates relative to the body. That is, the guide portion can be at least partially connected to the body via the connecting portion, without directly connecting the entire guide portion to the body. Therefore, the elongated guide portion, which extends in the longitudinal direction, can be disposed substantially in the center of the hollow portion of the body and oscillated, thereby ensuring a sufficient range of oscillatory motion of the support member.

Further, in the present disclosure, the guide portion can be formed with a simple shape that extends in one direction, and the oscillating mechanism can have a simple configuration.

The connecting portion is integral with the guide portion.

In this case, because the guide portion and the connecting portion can be integrally formed, the parts count can be reduced and the structure simplified. Further, since the guide portion and the connecting portion oscillate in unison, the weight provided on the guide portion can oscillate without wasted motion.

The guide portion has a first shaft-shaped portion that extends in the shape of a shaft.

In this case, the weight can be guided linearly along the first shaft-shaped portion to move smoothly. Further, the weight can be disposed in the guide portion with a simple structure, for example, by inserting the first shaft-shaped portion into the weight or by inserting the weight into the first shaft-shaped portion.

The guide portion also includes a second shaft-shaped portion extending in the same direction as the first shaft-shaped portion.

In this case, since the structure is such that the weight is guided using the first and second shaft-shaped portions, which extend parallel to each other as a guide, the movement of the weight can be stabilized.

The weight has an engagement portion that engages the guide portion, and the engagement portion has a first groove portion that engages with the first shaft-shaped portion.

In this case, the first groove portion (engagement portion) of the weight can move in engagement with the first shaft-shaped portion of the guide portion. Since the first shaft-shaped portion is configured to engage with the first groove portion of the weight, the weight can be made to move without separating from the first shaft-shaped portion.

The weight has an engagement portion that engages with the guide portion, and the engagement portion has a first groove portion that engages with the first shaft-shaped portion and a second groove portion that engages with the second shaft-shaped portion.

In this case, the first and second groove portions of the weight can move while being respectively engaged with the first and second shaft-shaped portions, which are the guide portions. Since the first shaft-shaped portion is configured to engage with the first groove portion of the weight and the second shaft-shaped portion is engaged with the second groove portion, the weight can move without separating from the first shaft-shaped portion and the second shaft-shaped portion. Further, in this case, because the weight can be sandwiched between the first shaft-shaped portion and the second shaft-shaped portion, the orientation of the weight can always be stably maintained.

The guide portion includes a housing portion that houses the weight so as to be movable.

In this case, the weight can be housed inside a groove-shaped or cylindrical guide portion so as to be movable. In the present disclosure, since the weight moves inside the guide portion, the weight itself does not require any processing in order to be held in the guide portion.

The guide portion has a cylindrical portion that includes the housing portion and that extends in the direction of movement of the weight.

In this case, since the weight is housed in the cylindrical portion of the guide portion, the weight can be moved along the cylindrical portion.

The weight has an engagement portion that engages the guide portion.

In this case, the weight can move in a state in which the engagement portion is engaged with the guide portion. That is, since the guide portion is configured to engage with the engagement portion of the weight, the weight can be moved without separating from the guide portion.

The weight is formed in a columnar shape.

In this case, since the cross section of the weight does not change and is constant in the longitudinal direction of the guide portion, the oscillation of the weight can be stabilized in a well-balanced manner.

The weight is formed in a cylindrical shape.

In this case, since the cross section of the weight is circular, the oscillation of the weight can be stabilized in a well-balanced manner.

The weight has a hole into which the guide portion is inserted.

In this case, the guide portion can be inserted into the hole of the weight, and the weight can be moved along the guide portion.

The hole passes through the cross-sectional center of the weight.

In this case, since the guide portion passes through the center of the weight, the positional relationship between the guide portion and the weight is constant over the entire range of oscillation of the support member. As a result, the behavior of the lure does not change due to differences in the magnitude of the oscillation (angle of oscillation) and can approximate the behavior of a real fish more closely.

A spring part that biases the weight toward the front side of the support member is also provided.

In this case, the weight can be held in the front side position of the body by the biasing force of the spring part. Then, when a force in a direction that moves the weight rearward acts on the body, such as when the fishing line of the lure is pulled or during casting, the weight is guided by the guide portion and moves rearward, against the biasing force of the spring part. Then, when the force that moves the weight rearward is gone, the weight returns to its original position due to the biasing force of the spring part. In this manner, in the present disclosure, the weight can be moved only when desired, and in normal cases, the weight can be held in a prescribed position in the forward direction.

A centering mechanism that biases the weight, which is positioned in front of the support member, in a neutral position of the range of oscillation of the support member, is provided.

In this case, because the support member, together with the weight, can be centered in the center of the left-right direction, the floating attitude and the rising attitude of the lure is improved.

The weight is made of magnetic material, and the centering mechanism is a magnet that is provided on the body side and that attracts the weight at the neutral position.

In this case, the magnetic force of the magnet attracts the oscillating weight and forces it to the neutral position, so that it is easier for the weight to return to the neutral position due to the magnetic force of the magnet and to center the support member, together with the weight, in the center in the left-right direction.

A lure according to the present disclosure comprises a body having an interior hollow portion, a shaft that extends in a longitudinal direction of the body within the hollow portion, and a weight that can move along the shaft and that oscillate about the shaft, and a centering mechanism that positions the weight in a neutral position of the range of oscillation of the weight can be provided.

By the lure of the present disclosure, when the lure is pulled and placed in a swimming attitude, the weight moves to the rear side of the shaft due to inertia, and the weight, which is eccentric with respect to the shaft, oscillates, thereby increasing the uncertainty of the movement (swimming) of the lure and making the behavior of the lure more closely resemble that of a real fish.

Then, when pulling of the lure is stopped and the weight is positioned at the front-end portion of the shaft, the centering mechanism restricts the rotation of the weight with respect to the shaft. Therefore, the weight can be centered in the center of the range of oscillation, and the floating attitude and the rising attitude of the lure is improved.

In the centering mechanism, the weight has a through-hole through which the shaft is inserted at an eccentric position, and the shaft has a non-circular portion that engages the through-hole of the weight at a front end in the axial direction.

In this case, when pulling of the lure is stopped and the weight is positioned at the front end of the shaft, the through-hole of the weight engages the non-circular portion of the shaft, and the rotation of the weight with respect to the shaft is restricted. As a result, the weight can be centered in the center of the range of oscillation, and the floating attitude and the rising attitude of the lure is improved.

The weight is made of magnetic material, and the centering mechanism is a magnet that is disposed on the body side and that attracts the weight at the neutral position.

In this case, when pulling of the lure is stopped and the weight is positioned at the front end of the shaft, the weight, which is made of a magnetic material, is attracted by the magnet so as to be in a neutral position, and the rotation of the weight with respect to the shaft is restricted. Thus, the weight can be centered in the center of the range of oscillation, and the floating attitude and the rising attitude of the lure is improved.

A biasing member can be provided that biases the weight toward the front side of the shaft.

In this case, since the weight is biased toward the front by the biasing member, when the lure is pulled, the weight can be moved into a position where the weight can oscillate rearward (in the pulling direction of the lure) against the biasing force of the biasing member, thereby placing the lure in a swimming attitude. When the tensile force of the lure is less than the biasing force of the biasing member, the weight, which is in a position to be able to oscillate by means of the biasing force of the biasing member, then moves to the non-circular portion on the front side and engages therewith, positioning the weight in a neutral position of the range of oscillation.

By the lure according to the present disclosure, the behavior of a real fish can more closely approximated and the flight distance of the lure can be increased.

DETAILED DESCRIPTION OF EMBODIMENTS

Figure 1:
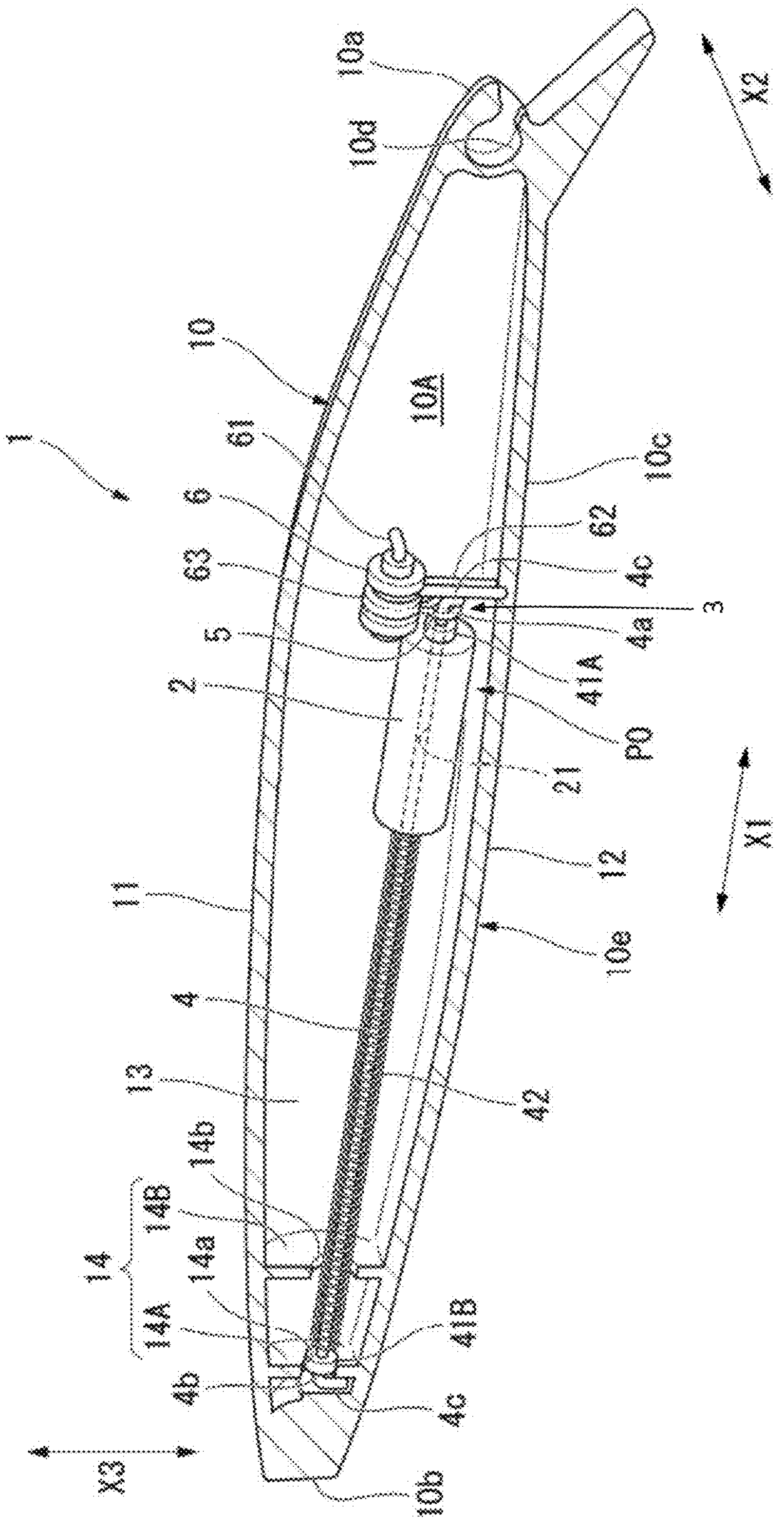
FIG. 1 is a longitudinal cross-sectional view showing the internal structure of the body of a lure according to a first embodiment of the present disclosure.
Figure 2:
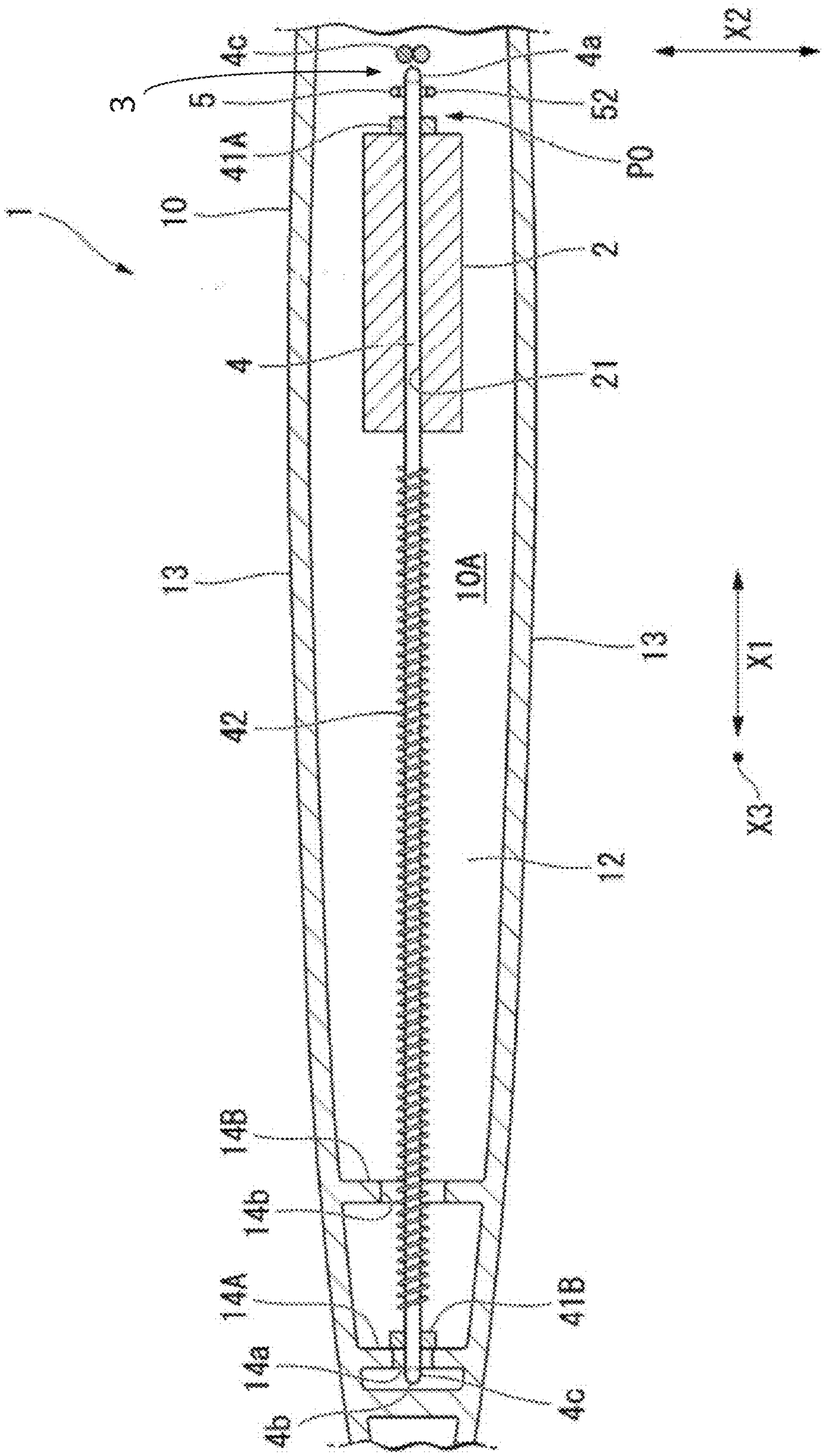
FIG. 2 is a horizontal cross-sectional view of the lure of FIG. 1, showing the main parts of the support member and the weight from above.

A lure according to an embodiment will be described below with reference to the drawings. FIG. 1 is a side view of a lure 1 according to the embodiment. FIG. 2 is a top view of the lure 1 according to the embodiment. As shown in FIGS. 1 and 2, the lure 1 includes a body 10. The body 10 includes a head portion and a tail portion. A fishing line connection part 5 for tying a fishing line is attached to the head portion.

An embodiment of a lure according to the present invention is described below with reference to the figures. In each of the drawings, there are cases in which the scale of each component has been appropriately changed as required to improve the visibility of the component.

First Embodiment

As shown in FIGS. 1 and 2, a lure 1 according to the first embodiment is an example of an integrated lure that is used for fishing, that is made of hard plastic, and that resembles the shape of a small fish.

Here, in the lure 1, the direction in which the head and the tail are connected in a straight line is defined as the front-rear direction X1, the head side is defined as the front/front side, and the tail side is defined as the rear/rear side. Further, as seen from above, the lateral direction orthogonal to the front-rear direction X1 is defined as the left-right direction X2, and the up-down direction of the lure 1 when in the swimming attitude is defined as the up-down direction X3 in the following descriptions.

The lure 1 comprises a body 10 having a hollow portion 10A inside, a weight 2 that moves in the hollow portion 10A, and a support member 3 that has a shaft 4 (guide portion) extending in a longitudinal direction of the body 10 so as to guide the weight 2 and that oscillates inside the hollow portion 10A.

The body 10 has a streamlined outer shape that simulates a fish and is formed completely in one piece. In FIG. 1, the right side of the sheet is a front-end portion 10*a* on the head side of the body 10, and the left side of the sheet is a rear-end portion 10*b* on the tail side of the body 10. A first attachment portion 10*d*, to which a fishing line connection part, not shown, is attached, is disposed on the front-end portion 10*a* of the body 10. The rear-end portion 10*b* and a lower portion 10*c* of the body 10 include fishing line connection portions (not shown) to which a fish hook, not shown, can be connected. The fishing line connection portion disposed in the lower portion 10*c* is not limited to one connection portion, but can include a plurality of connection portions.

The body 10 is integrally formed by bonding, welding, etc., a pair of parts that are longitudinally divided into left and right parts, for example.

The body 10 has a shape in which the cross section is largest at a central portion 10*e* in the front-rear direction X1. That is, the body 10 is thicker from the front-end portion 10*a* to the central portion 10*e* and is thinner from the central portion 10*e* to the rear-end portion 10*b*, forming a smooth curve overall. The material of the body 10 is not limited to synthetic resin, as described above, but can be made of metal or wood, for example. The interior of the body 10 has the hollow portion 10A, described above.

The body 10 has an upper wall 11, a lower wall 12, and a pair of side walls 13. A plurality of (here, two) partition walls 14A, 14B that partition the hollow portion 10A in the front-rear direction X1 are disposed inside the body 10. Specifically, the partition walls 14 include a rear partition wall 14A that partitions the hollow portion 10A front and back on the rear-end portion 10*b* side, and a middle partition wall 14B arranged spaced apart from the rear partition wall 14A to the front (refer to FIG. 3). The rear partition wall 14A and the middle partition wall 14B each include a first opening hole 14*a*, and a second opening hole 14*b*, which are coaxial with each other at the central portions thereof. The respective hole diameter of the first opening hole 14*a* and the second opening hole 14*b* is larger than the diameter of the shaft 4. The second opening hole 14*b* has a larger diameter than the first opening hole 14*a*.

The support member 3 comprises the above-mentioned shaft 4 (guide portion, first shaft-shaped portion) extending in the shape of a shaft, and a connecting portion 5 that connects the shaft 4 to the body 10 so as to be capable of oscillation. The support member 3 oscillates in a plane that intersects the longitudinal direction of the shaft 4. The axial direction of the shaft 4 is disposed to extend in the front-rear direction X1 in the non-oscillating state (hereinafter referred to as initial position P0).

The weight 2 is formed in a cylindrical (columnar) shape and has a through-hole 21 (engagement portion, hole) through which the shaft 4 is inserted at the center of the circle. The through-hole 21 passes through the center of the cross section orthogonal to the direction in which the weight 2 is guided by the shaft 4.

The specific gravity of the weight 2 is greater than the specific gravity of the body 10. The material of the weight 2 is a metal such as lead, a lead alloy, brass, tungsten, tungsten alloy, steel, and stainless steel, but materials such as rubber, resin, or wood can also be used.

The weight 2 is attached so as to be movable while being guided in the axial direction of the shaft 4, in a state in which the shaft 4 is coaxially passed through the through-hole 21. The weight 2 is positioned near the head portion of the lure 1 when attached to the shaft 4.

Figure 4:
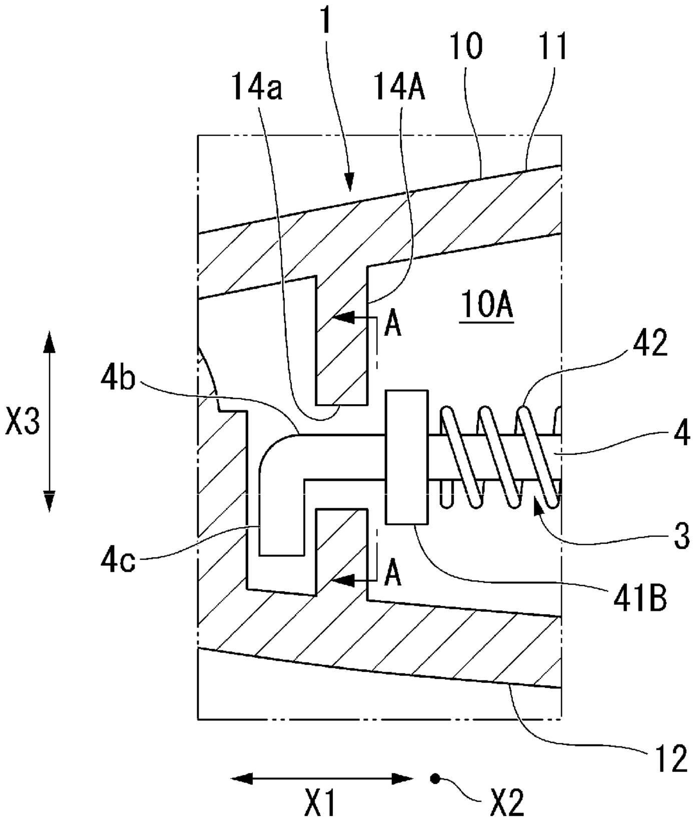
FIG. 4 is a longitudinal cross-sectional view showing the configuration of the rear-end portion of the shaft.
Figure 5:
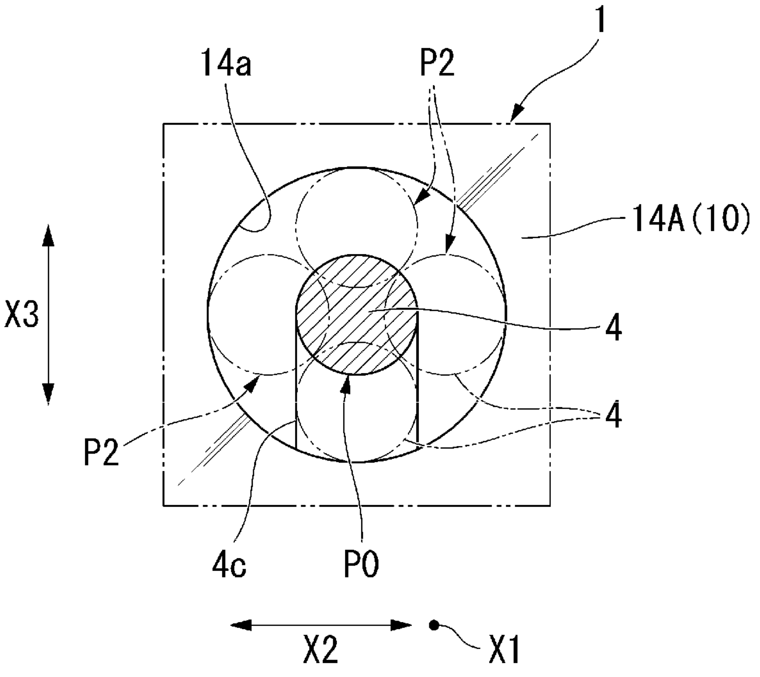
FIG. 5 is a cross-sectional arrow view through line A-A in FIG. 4.

The shaft 4 is composed of a rod member made of a metal, such as iron or stainless steel. When passing through the middle partition wall 14B and the rear partition wall 14A, a front-end portion 4*a* of the shaft 4 is supported so as to be capable of oscillating with respect to the connecting portion 5 whose movement in the front-rear direction X1 is restricted, and a rear-end portion 4*b* is supported so as to be freely movable inside the first opening hole 14*a* with respect to the rear partition wall 14A of the body 10, as shown in FIGS. 4 and 5. The front-end portion 4*a* and the rear-end portion 4*b* of the shaft 4 each have a bent portion 4*c* that is bent in a direction essentially orthogonal to the shaft axis direction (left-right direction X2 in the present embodiment). The length of the shaft 4 in the longitudinal direction is such that the weight 2 that is guided by the shaft 4 is located in the front of the body 10 in a state in which no load is acting on the weight 2.

Figure 6:
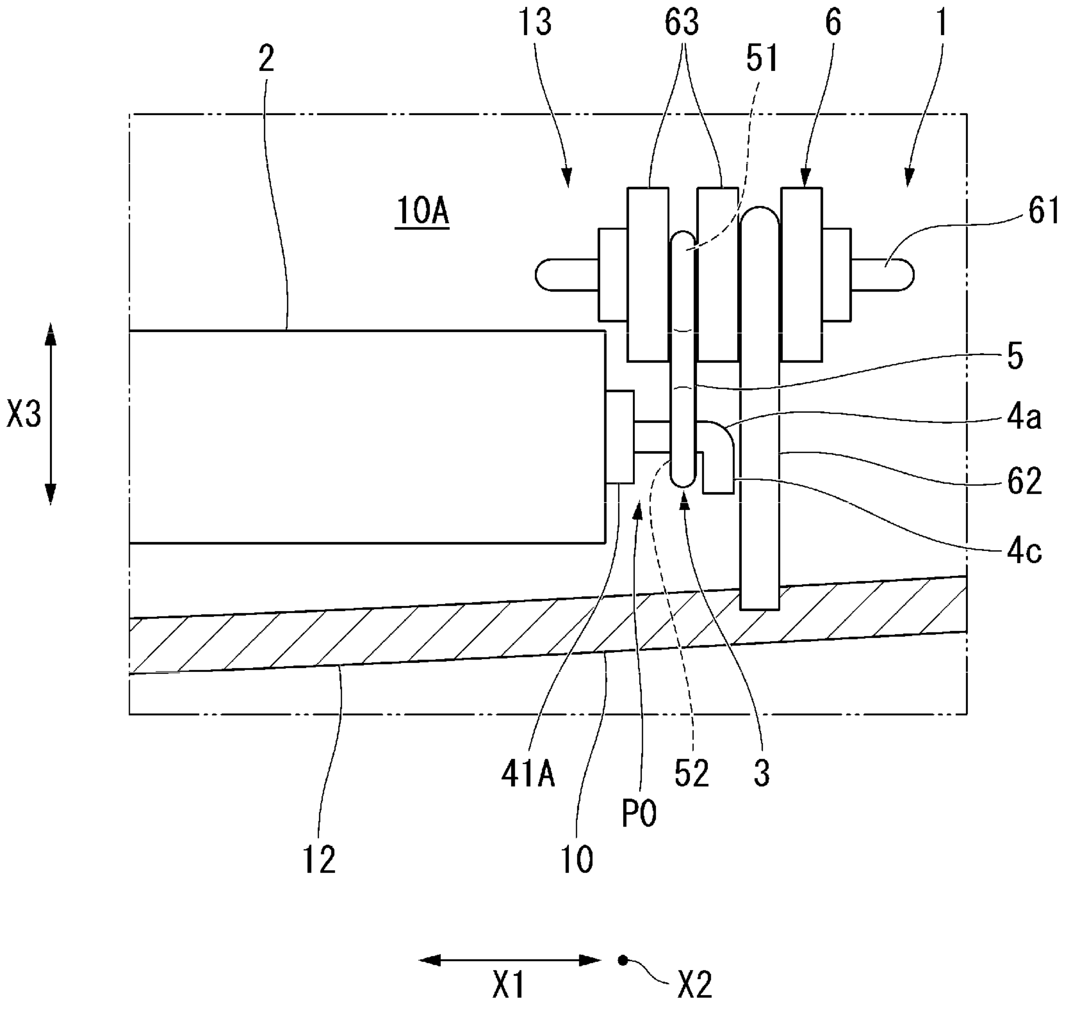
FIG. 6 is a side view showing the configuration of the front-end portion of the shaft.
Figure 7:
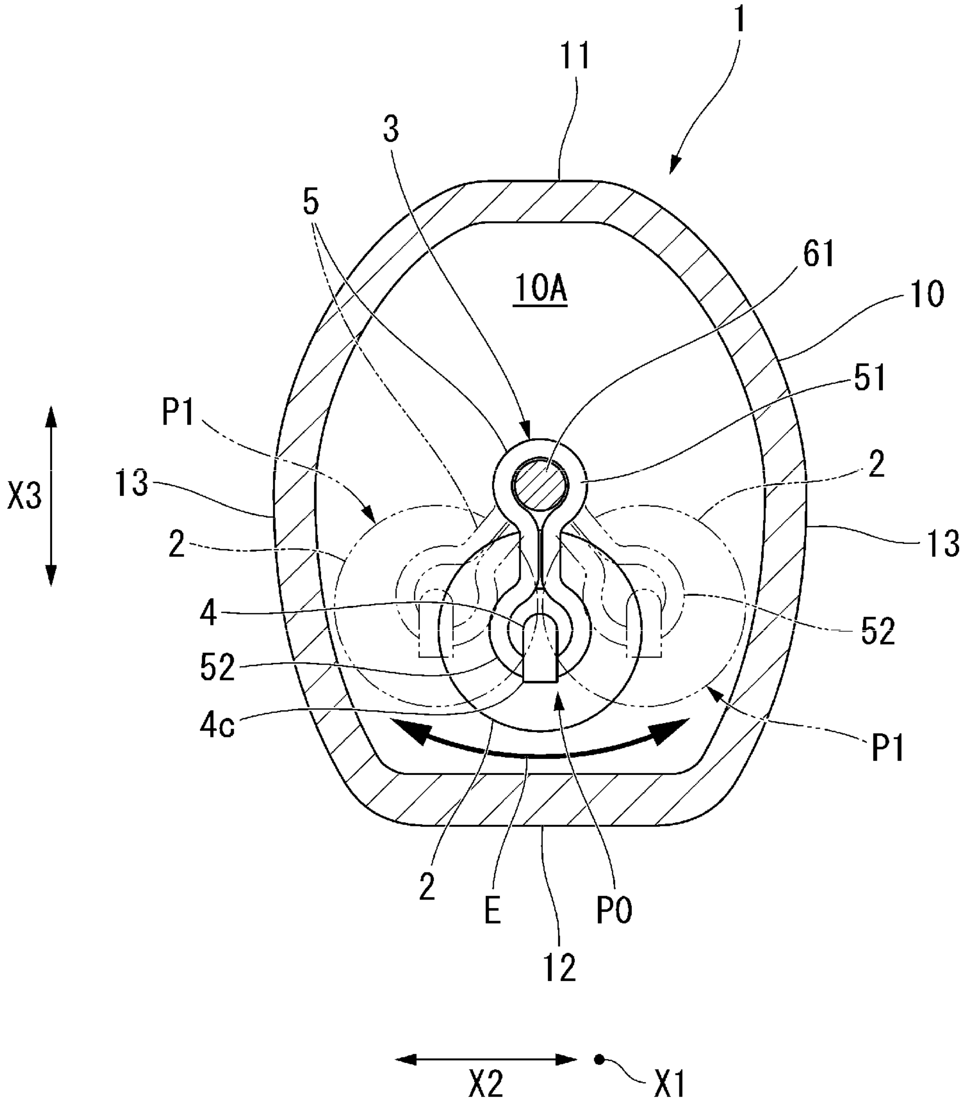
FIG. 7 is a view of the support member from the front.

As shown in FIGS. 6 and 7, the front-end portion 4*a* of the shaft 4 is inserted from a second engagement hole 52 (described further below) of the connecting portion 5 from the rear, and is supported by the connecting portion 5 in a state in which the front side bent portion 4*c* is engaged with the front side of the connecting portion 5. As shown in FIGS. 4 and 5, the rear-end portion 4*b* of the shaft 4 is inserted into the first opening hole 14*a* from the front with respect to the rear partition wall 14A, and is supported by the rear partition wall 14A in a state in which the rear side bent portion 4*c* is engaged with the rear side of the rear partition wall 14A. The movement of the shaft 4 in the front-rear direction X1 is thereby restricted. As shown in FIG. 7, the front side of the shaft 4 oscillates in the left-right direction X2 (direction of the arrow E) together with the connecting portion 5. The rear side of the shaft 4 becomes a free end that can move within the range of the first opening hole 14*a* as seen from the front-rear direction X1.

Figure 3:
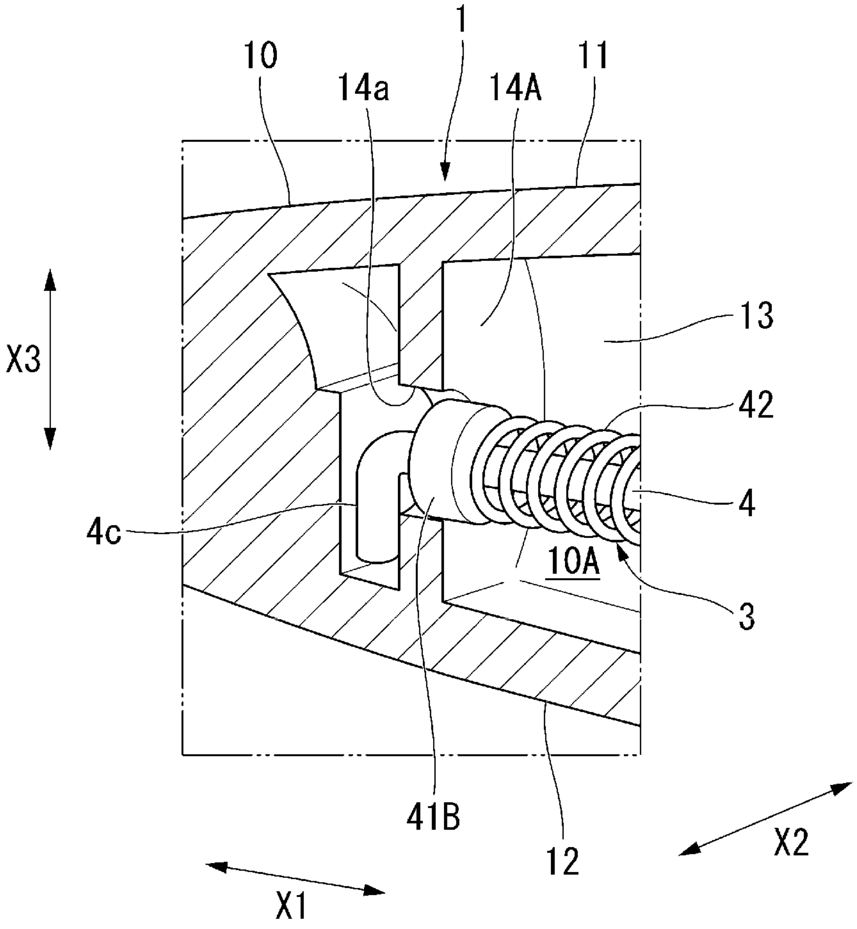
FIG. 3 is a perspective view showing the configuration of the rear-end portion of a shaft.

As shown in FIGS. 1 and 2, a pair of engagement rings 41A, 41B are fixed, in an inserted state, at prescribed positions on both sides of the shaft 4 in the axial direction. The first engagement ring 41A on the front side is located near the rear side of the connecting portion 5, as shown in FIG. 6. The second engagement ring 41B on the rear side is located near the front side of the rear partition wall 14A, as shown in FIGS. 3 and 4.

As shown in FIGS. 1 and 2, the weight 2 is disposed between the pair of engagement rings 41A, 41B on the shaft 4 via a spring member 42 (spring part) made of a coil spring. The shaft 4 is inserted inside the spring member 42. The weight 2 is arranged on the front side of the spring member 42, biased from the rear by the biasing force of the spring member 42, and is sandwiched between the first engagement ring 41A and the spring member. That is, the weight 2 is biased in the direction in which the lure 1 is pulled by the fishing line. The spring force (biasing force) of the spring member 42 is such that the weight 2 is easily released from its initial forward position and moves rearward against the biasing force by the tensile force that the body 10 receives due to the pulling action of the fishing line.

Then, for example, if the fishing line is strongly pulled such that the weight 2 is acted upon rearwardly, the weight 2 compresses the spring member 42 and is guided by the shaft 4 to move in the rearward direction.

As shown in FIG. 6, the connecting portion 5 is supported so as to be capable of oscillating with respect to a support body 6 that is fixed to the body 10.

The support body 6 is disposed in a position near the head portion (front-end portion 10*a*) of the body 10 (refer to FIG. 1). The support body 6 comprises an oscillation shaft 61 that is fixed to the side wall 13 of the body 10 and extends in the front-rear direction X1, a leg portion 62 that supports the oscillation shaft 61 from the lower wall 12, and a holding plate 63 that sandwiches the connecting portion 5 supported by the oscillation shaft 61 from both the front and rear sides. The oscillation shaft 61 is positioned directly above the central axis of the shaft 4 at the initial position P0.

The connecting portion 5 has the approximate form of spectacles and has engagement holes 51, 52 at the two ends. The connecting portion 5 is supported such that the first engagement hole 51 can rotate around the oscillation shaft 61, and the front-end portion 4*a* of the shaft 4 is inserted in the second engagement hole 52. The bent portion 4*c* at the front end of the shaft 4 projects farther forward than the second engagement hole 52. The shaft 4 on which the weight 2 is disposed thereby oscillates, together with the connecting portion 5, in the left-right direction X2 (direction of the arrow E in FIG. 7) about the oscillation shaft 61. The chain double-dashed line of FIG. 7 indicates the connecting portion 5 at the oscillated position (oscillation position P1). When the connecting portion 5 is at the initial position P0, the position of the second engagement hole 52 (shaft 4) is in the vertically downward position due to its own weight.

The shape and size of the connecting portion 5 and the weight 2 are set such that when the connecting portion 5 oscillates, the weight 2 only oscillates in the hollow portion 10A without coming into contact with the inner surface of the body 10.

In the lure 1 configured in this manner, as shown in FIGS. 1 and 2, the weight 2 is usually located near the head portion, since the center of gravity of the lure 1 is near the head portion. Since the lure 1 swims with an attitude in which the head portion is lower than the tail portion, the location of the center of gravity during the normal swimming attitude is at the appropriate position for the lure 1 in water. Then, when the lure 1, with an appropriate center of gravity position, is pulled by the fishing line with a force that exceeds the biasing force of the spring member 42, the center of gravity of the weight 2 moves rearward, the weight 2 compresses the spring member 42, and the weight 2 is guided by the shaft 4 and oscillates rearward (toward the tail portion side). Further, when the lure 1 is pulled by the fishing line, the support member 3 oscillates in the left-right direction X2. That is, as shown in FIG. 7, the connecting portion 5 turns around the oscillation shaft 61 from the initial position PO to the oscillation position P1, and the front-end portion 4*a* of the shaft 4, which is connected to the connecting portion 5, oscillates in the left-right direction X2 together with the weight 2.

Further, in the present embodiment, as shown in FIGS. 4 and 5, the rear-end portion 4*b* of the shaft 4 is a free end within the first opening hole 14*a* of the rear partition wall 14A, and thus can move up and down, left and right, within the range of oscillation. The shaft 4 indicated by the two-dot chain lines of FIG. 5 indicate movable positions P2.

In this manner, the lure 1 moves with an irregular, complex motion, which is unlike periodic motion, due to the oscillation and the movement of the center of gravity that moves along the shaft 4 of the weight 2. The lure 1 thus more closely approximates the swimming behavior of a real fish, which effectively appeals to other fish.

Further, when the lure 1 is cast and in flight, the weight 2 is guided by the shaft 4 and oscillates rearward due to centrifugal and inertial forces during the flight, the lure 1 maintains its rearward movement and can fly in a stable attitude with the tail portion at the front. Since the center of gravity of the lure 1 is on the tail side, there is the advantage that a long flight distance can be achieved.

Next, the operation of the lure 1 configured in this manner will be described in detail based on the drawings.

By the lure 1 according to the present embodiment, as shown in FIGS. 1-7, the support member 3 including the shaft 4 that extends in the longitudinal direction and that has the weight 2 can oscillate, so that the movement (swimming) of the lure 1 can be made more erratic to approximate the behavior of a real fish more closely. Further, by the lure 1 of the present embodiment, since the weight 2 oscillates together with the shaft 4, the weight 2 can reliably oscillate within the range of oscillation of the shaft 4, so that the behavior of the weight 2 is not restricted by the shaft 4. The weight 2 is then guided and moves only in the direction in which the shaft 4 extends, and the weight 2 does not separate from the shaft 4 even when the shaft 4 oscillates. As a result, the weight 2 can be prevented from colliding with the body 10.

Further, in the present embodiment, when the lure 1 is in flight during casting, the centrifugal force acting on the weight 2 causes the weight 2 to move to the tail side where it is guided by the shaft 4 and faces forward, thereby increasing the flight distance.

In this manner, by the present disclosure, both real fish-like movement and improved flight distance can be achieved.

Furthermore, in the present embodiment, since the support member 3 oscillates in a plane intersecting the longitudinal direction of the shaft 4, the support member 3 extending in the longitudinal direction can oscillate smoothly and the behavior of a real fish can be realized efficiently.

Further, in the present embodiment, because the support member 3 has the connecting portion 5 that connects the shaft 4 to the body 10 so as to be capable of oscillating, the shaft 4 can oscillate via the connecting portion 5, which oscillates relative to the body 10. That is, the shaft 4 can be at least partially connected to the body 10 via the connecting portion 5 without directly connecting the entire shaft 4 to the body 10. Therefore, the long shaft 4, which extends in the longitudinal direction, can be disposed approximately in the center of the hollow portion 10A of the body 10 and can oscillate, thereby ensuring a sufficient range of oscillation of the support member 3.

Further, in the present disclosure, it is possible to form the shaft 4 in a simple shape that extends in one direction and to simplify the configuration of the oscillating mechanism.

Further, in the present embodiment, the shaft 4 (first shaft-shaped portion) extends in the shape of a shaft, allowing the weight 2 to be guided linearly along the shaft 4 and to move smoothly.

Further, the weight 2 can be provided on the shaft 4 by means of a simple structure, in which the shaft 4 is inserted in the weight 2, as in the present embodiment, for example.

Further, in the present embodiment, the weight 2 can move in a state in which the shaft 4 is inserted through, and engages with, the through-hole 21, which is the engagement portion of the weight 2. That is, since the shaft 4 is configured to engage with the through-hole 21 of the weight 2, the weight 2 can be moved without separating from the shaft 4.

Further, in the present embodiment, the weight 2 is formed in a cylindrical (columnar) shape, therefore the cross section of the weight 2 is circular and does not change and is constant in the longitudinal direction of the shaft 4, so that the oscillation of the weight 2 can be stabilized in a well-balanced manner.

In the present embodiment, since the shaft 4 passes through the through-hole 21 located at the center of the weight 2, the positional relationship between the shaft 4 and the weight 2 is constant over the entire range of oscillation of the support member 3. As a result, the behavior of the lure 1 does not change due to differences in the magnitude of the oscillation (angle of oscillation), and the behavior of a real fish can be more closely approximated.

Further, in the present embodiment, the weight 2 can be held in the front side position of the body 10 by the biasing force of the spring part 42. Then, when a force in a direction that moves the weight 2 rearward acts on the body 10, such as when the fishing line of the lure 1 is pulled or during casting, the weight 2 is guided by the shaft 4 and moves rearward, against the biasing force of the spring member 42. Then, when the force in the direction that moves the weight 2 rearward disappears, the weight 2 is returned to the original position by the biasing force of the spring member 42.

In this manner, in the present disclosure, the weight 2 can be moved only when centrifugal force acts on it during flight, and in normal cases, it is possible to hold the weight 2 at a prescribed position in the front.

By the lure 1 according to the present embodiment configured as described above, the behavior of a real fish can be more closely approximated and the flight distance of the lure 1 can be increased.

Next, other embodiments and modified examples of the lure according to the present embodiment will be described. Compositional elements that have the same functions as the compositional elements of the above-described first embodiment are given the same codes and detailed descriptions thereof are omitted to avoid redundant descriptions.

Second Embodiment

Figure 8:
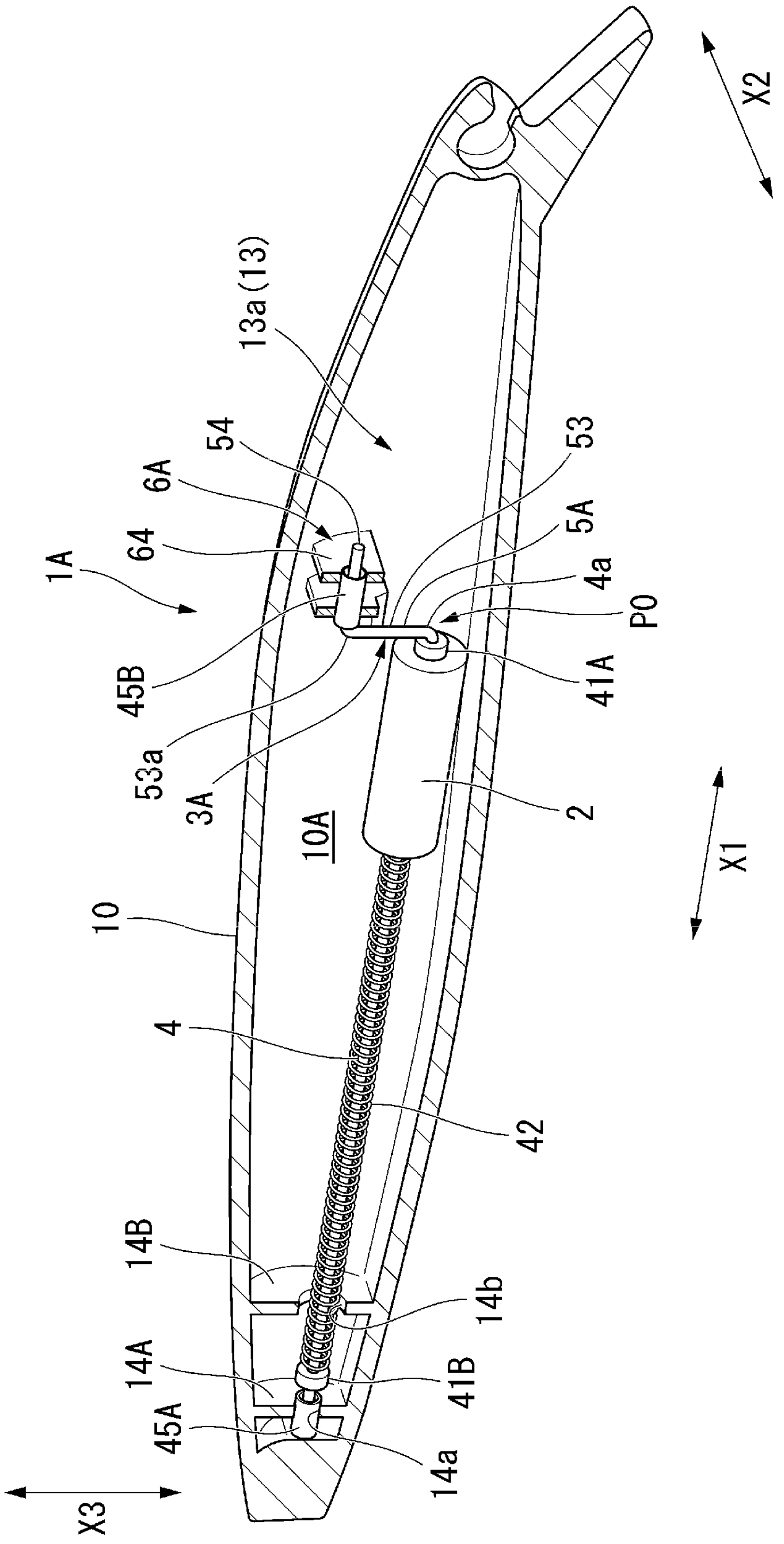
FIG. 8 is a longitudinal cross-sectional view showing the internal structure of the body of the lure according to a second embodiment of the present disclosure.

Next, a lure 1A according to a second embodiment shown in FIG. 8 is a lure in which the structure of the connecting portion 5 and the supporting structure of the rear-end portion 4*b* of the shaft 4 of the above-described lure 1 have been replaced.

In a support member 3A of the lure 1A according to the second embodiment, the shaft 4 (guide portion, first shaft-shaped portion) and a connecting portion 5A are integrally formed.

Figure 9:
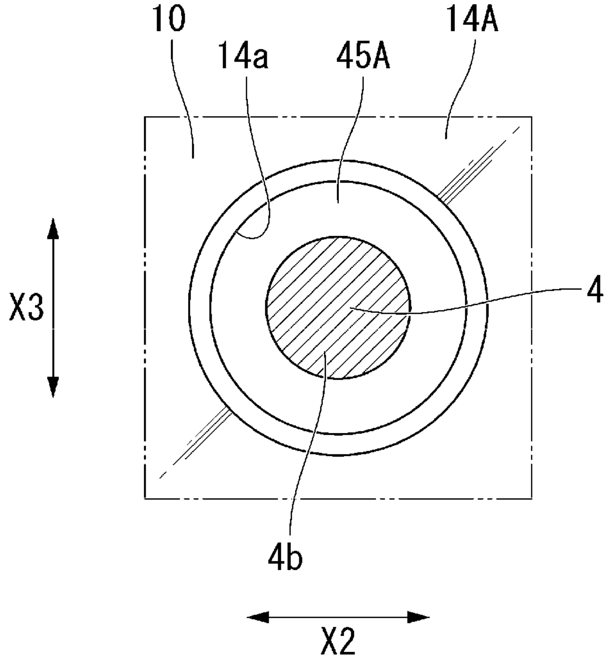
FIG. 9 is a view of the configuration of the rear-end portion of the shaft from the front, corresponding to FIG. 5.

A cylindrical first support cylinder 45A made of metal is fitted onto the rear-end portion 4*b* of the shaft 4. As shown in FIG. 9, the first support cylinder 45A is inserted into the first opening hole 14*a* of the rear partition wall 14A of the body 10 without any gaps. The outer diameter of the first support cylinder 45A matches the inner diameter of the first opening hole 14*a*. The rear-end portion 4*b* of the shaft 4 is thus immovably supported without oscillating up, down, left, or right.

Figure 10:
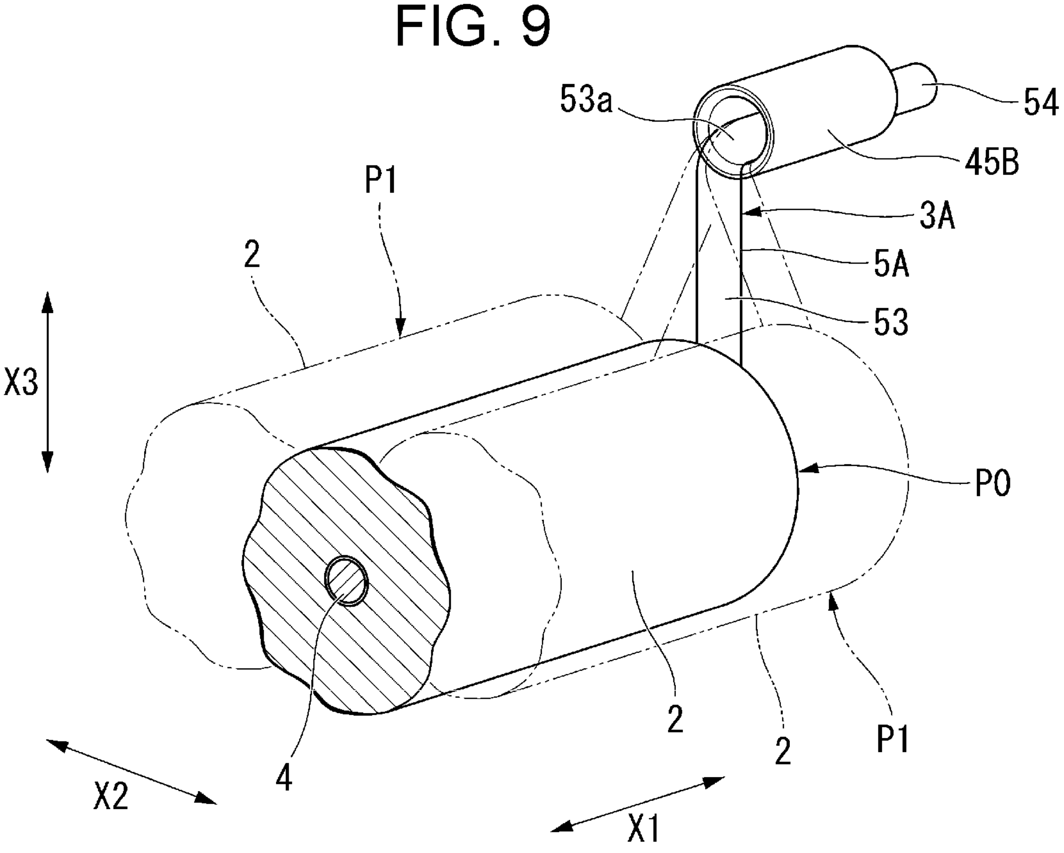
FIG. 10 is a perspective view showing the configuration of the connecting portion on the front side of the shaft.

As shown in FIGS. 8 and 10, the connecting portion 5A, which integrally includes the shaft 4 is bent in approximately in the shape of an L. The connecting portion 5A includes a first arm portion 53 that is connected to the front-end portion 4*a* of the shaft 4 and a second arm portion 54 that can rotate with respect to a support body 6A that is fixed to the body 10. The first arm portion 53 extends in a direction orthogonal to the axial direction of the shaft 4. The second arm portion 54 is connected to one end 53*a* of the first arm portion 53, is orthogonal to the first arm portion 53, and extends forward in the same direction as the axial direction of the shaft 4. A pipe-shaped second support cylinder 45B made of metal is loosely fitted onto the second arm portion 54.

As shown in FIG. 8, the support body 6 has a projecting fixing piece 64 that is fixed to an inner surface 13*a* of the side wall 13 of the body and that projects toward the center of the hollow portion 10A from the side wall 13. The second support cylinder 45B, into which the second arm portion 54 of the connecting portion 5 is inserted, is fixed to the projecting fixing piece 64. The fixing position of the second support cylinder 45B is positioned directly above the central axis of the shaft 4 at the initial position P0. The center of oscillation of the support member 3A is inside the cylinder shaft of the second support cylinder 45B.

Figure 11:
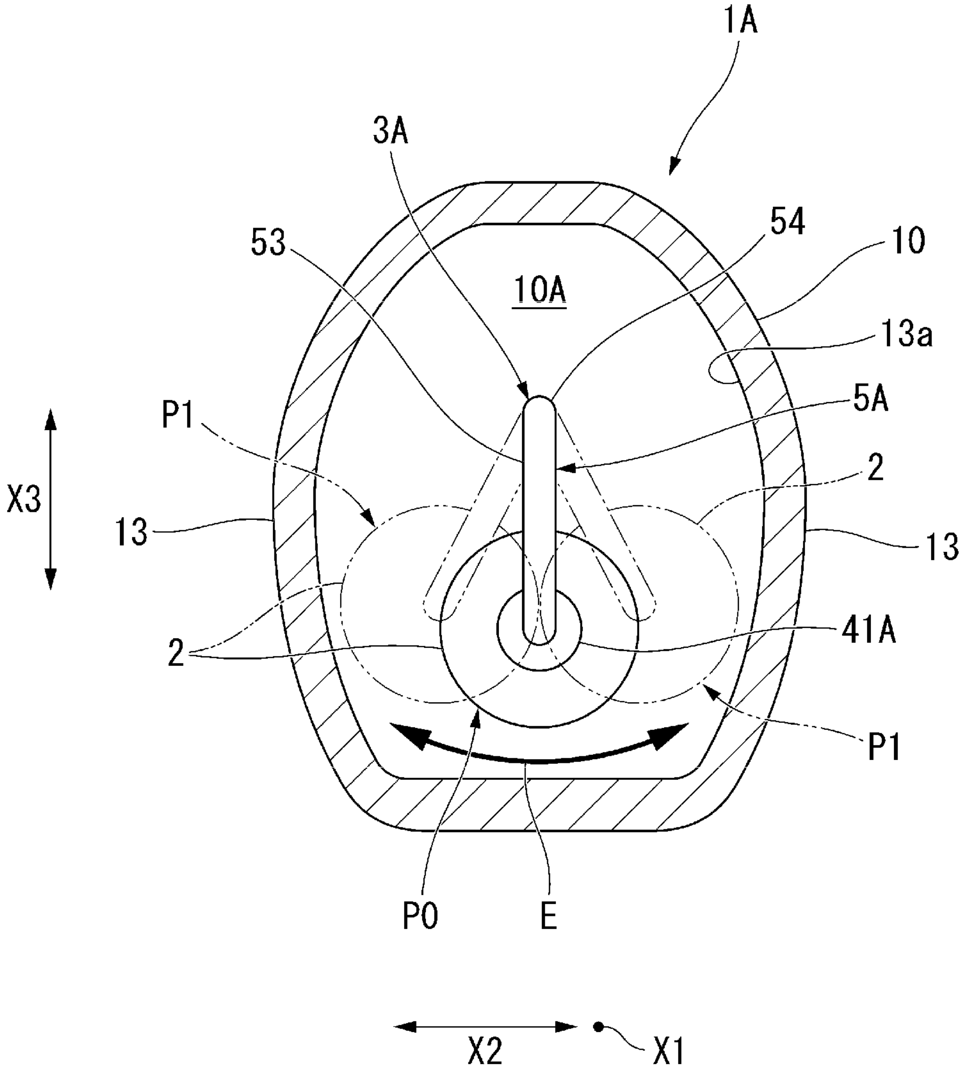
FIG. 11 is a view of the support member from the front.

The shaft 4 on which the weight 2 is disposed oscillates in the left-right direction X2 (direction of the arrow E in FIG. 11) about the second arm portion 54 on which the second support cylinder 45B is fitted together with the connecting portion 5A. In the initial position P0, the support member 3A, which includes the weight 2, is positioned such that the axial direction of the first arm portion 53 of the connecting portion 5A is oriented vertically due to its own weight.

By the lure 1A according to the second embodiment configured in this manner, a part of the support member 3A (here, the second arm portion 54 of the connecting portion 5) is connected to the inner surface of the body 10 (inner surface 13*a* of the side wall 13), and the support member 3A can be arranged at a prescribed position in the hollow portion 10A, so that the range of oscillation of the support member 3A can be set within a certain range. That is, since the support member 3A oscillates uniformly, unnatural behavior of the lure 1A can be prevented.

Further, in the second embodiment, instead of oscillating the entire long support member 3A, only the parts of the support member 3A that are not connected to the body 10 oscillates. For example, in the part of the tail side of the fish-shaped body 10 where the cross section of the hollow portion 10A of the body 10 tapers and becomes small, one end of the support member 3A can be arranged in the hollow portion 10A connected to the inner surface of the body 10. Therefore, even if the support member 3A oscillates in part of the hollow portion 10A with a small cross sectional area, the support member 3A can be prevented from coming into contact with the inner surface of the body 10.

Further, in the second embodiment, the shaft 4 extends in the shape of a shaft, therefore the weight 2 can be guided linearly along the shaft 4 to move smoothly. Further, the weight 2 can be disposed on the shaft 4 by a simple structure, in which the shaft 4 is inserted in the weight 2, or the weight 2 is inserted in the shaft 4, as in the present embodiment, for example.

FIRST MODIFIED EXAMPLE

Figure 12:
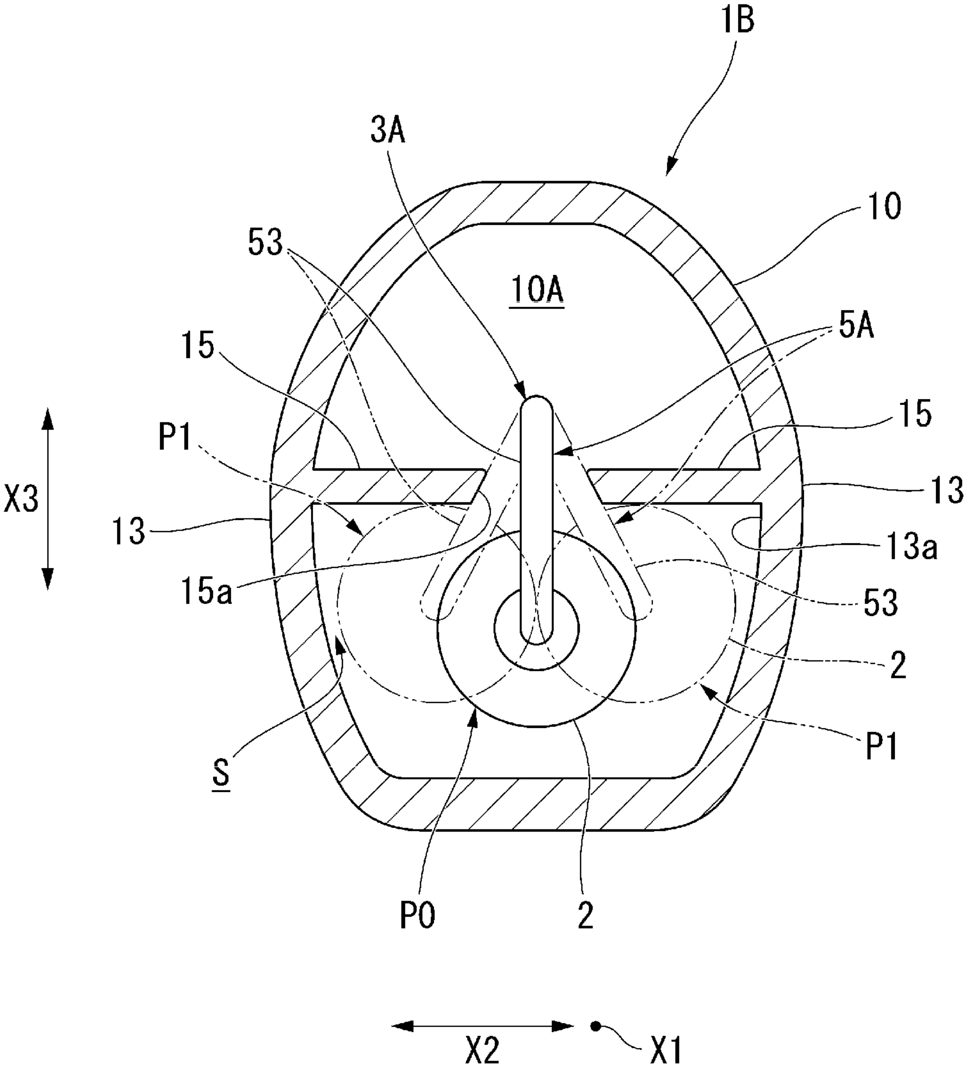
FIG. 12 is a view of the support member of the lure according to a first modified example from the front, corresponding to FIG. 11.

Next, a lure 1B according to a first modified example shown in FIG. 12 is configured such that in the second embodiment described above, an oscillation restricting wall 15 (restricting portion) that prevents the weight 2 from colliding with the inner surface 13*a* of the side wall 13 while oscillating in the hollow portion 10A of the body 10 is provided.

The oscillation restricting wall 15 is arranged on both the left and right sides of the second arm portion 54 of the connecting portion 5A of the support member 3A. The pair of oscillation restricting walls 15 are connected to approximately the central portion of the side wall 13 of the body 10 in the up-down direction X3, and extends from the side wall 13 toward the inner side of the left-right direction X2. An opening 15*a* that restricts the movement of the first arm portion 53 and determines the range of oscillation is formed between the pair of oscillation restricting walls 15.

The position of the pair of oscillation restricting walls 15 in the up-down direction X3 and the dimension of the opening 15*a* in the left-right direction X2 are set such that the weight 2, which oscillates together with the shaft 4, does not contact the inner surface 13*a* of the side wall 13. That is, there is a gap S between the inner surface 13*a* of the side wall 13 and the weight 2 located at the maximum oscillation position P1.

In the lure 1B according to the first modified example configured in this manner, when the support member 3A oscillates, the first arm portion 53 of the oscillating connecting portion 5A contacts the opening 15*a* of the oscillation restricting wall 15, so that the range of oscillation of the support member 3A is set to an appropriate range. Thus, since the range of oscillation of the weight 2, which oscillates together with the support member 3A, is also restricted, the weight 2, which oscillates in the hollow portion 10A inside the body 10, can be prevented from contacting the body 10.

Third Embodiment

Figure 13:
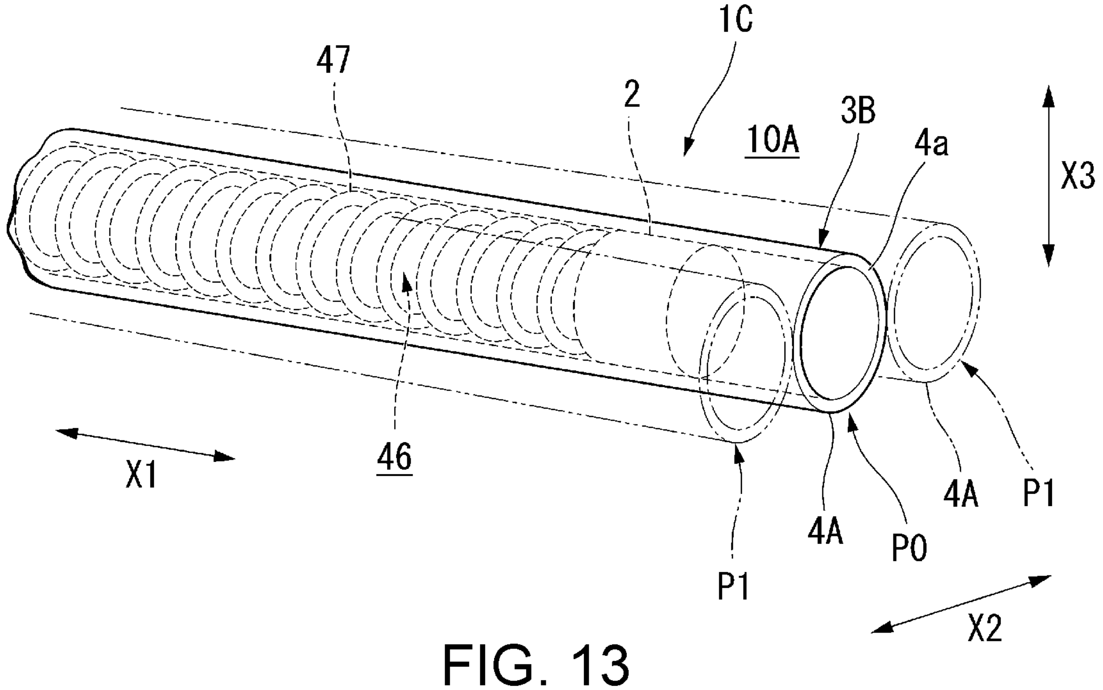
FIG. 13 is a perspective view of the main parts of the internal structure of the body of the lure according to a third embodiment as seen obliquely from the front.
Figure 14:
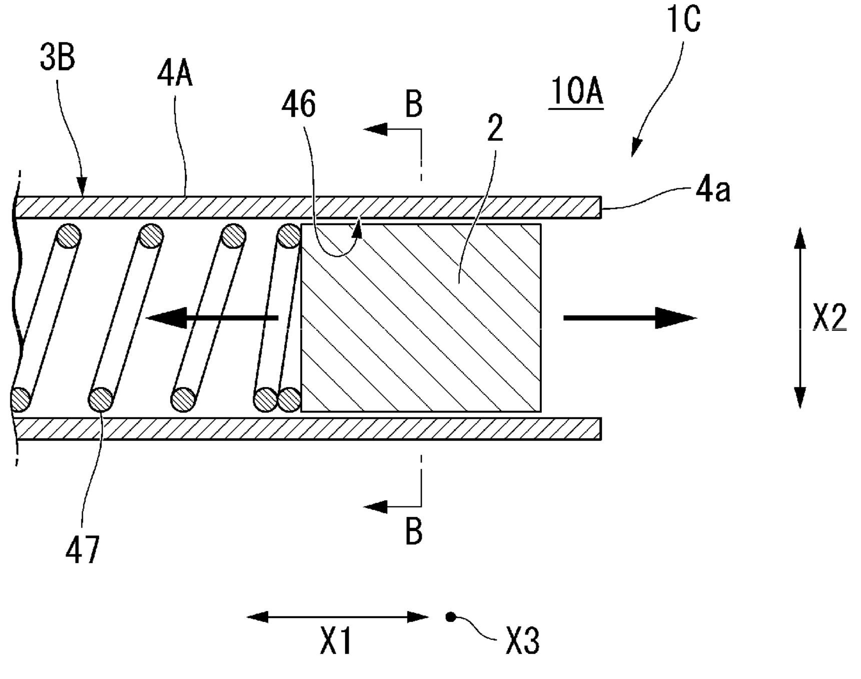
FIG. 14 is a horizontal cross-sectional view of the front-end portion of the support member of the lure shown in FIG. 13.

Next, as shown in FIGS. 13 and 14, a lure 1C according to a third embodiment is configured to have an oscillation mechanism in which the weight 2 is movably housed inside a cylinder 4A (guide portion, cylindrical portion) of a support member 3B.

The cylinder 4A of the lure 1C has a housing portion 46 that has a circular cross section and that houses the weight 2 so as to be movable. The cylinder 4A is made of a cylindrical member made of synthetic resin or a metal, such as steel or stainless steel. Although not shown, a rear-end portion of the cylinder 4A is immovable with respect to the body 10, or to be movable within the range of the opening hole 14*a* (refer to FIG. 1) of the rear partition wall 14A, as in the first embodiment described above. Further, the front-end portion 4*a* of the cylinder 4A is connected to a connecting portion (not-shown), either integrally or separately, as in the first or second embodiments above.

The weight 2 is cylindrical in shape. The outer diameter of the weight 2 approximately matches the inner diameter of the cylinder 4A.

Figure 15:
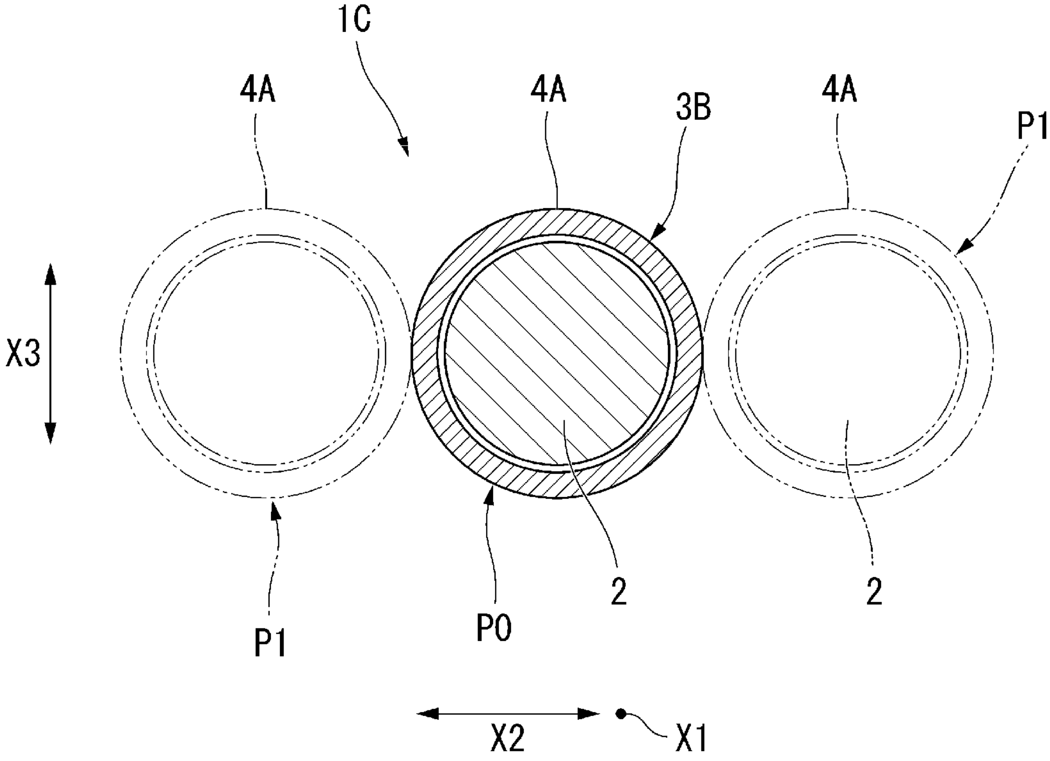
FIG. 15 is a cross-sectional view along line B-B line shown in FIG. 14.

At least the front side of the cylinder 4A, together with the weight 2, oscillates in the left-right direction X2, together with the connecting portion (refer to FIG. 15). In FIGS. 13 and 15, the solid lines indicate the cylinder 4A at the initial position P0, and the chain double-dashed lines indicate the cylinder 4A at the oscillation position P1. As shown in FIGS. 13 and 14, in the housing portion 46 of the cylinder 4A, a spring member 47 (spring part) made of a coil spring is interposed between the weight 2 and the rear-end portion (not shown) of the cylinder 4A. The outer diameter of the spring member 47 approximately matches the inner diameter of the cylinder 4A. The weight 2 is arranged on the front side of the spring member 47, biased from the rear by the biasing force of the spring member 47, and is held in a stopped state sandwiched between the rear-end portion of the cylinder 4A and the spring member. That is, the weight 2 is biased in the direction in which the lure 1C is pulled by the fishing line. The spring force (biasing force) of the spring member 47 is set such that the weight 2 is easily released from its initial position and moves rearward against the biasing force by a tensile force that the body 10 receives due to the pulling motion of the fishing line.

Then, if a rearward load acts on the weight 2, such as when the fishing line is pulled quickly, the weight 2 compresses the spring member 47 and is guided rearward by the cylinder.

By the lure 1C according to the third embodiment, since the cylinder 4A has the housing portion 46 that houses the weight 2 so as to be movable, the weight 2 can be housed inside the cylinder 4A so as to be movable. In the present embodiment, since the weight 2 moves inside the cylinder 4A, the weight 2 itself does not require processing in order to be retained in the cylinder 4A.

SECOND MODIFIED EXAMPLE

Figure 16:
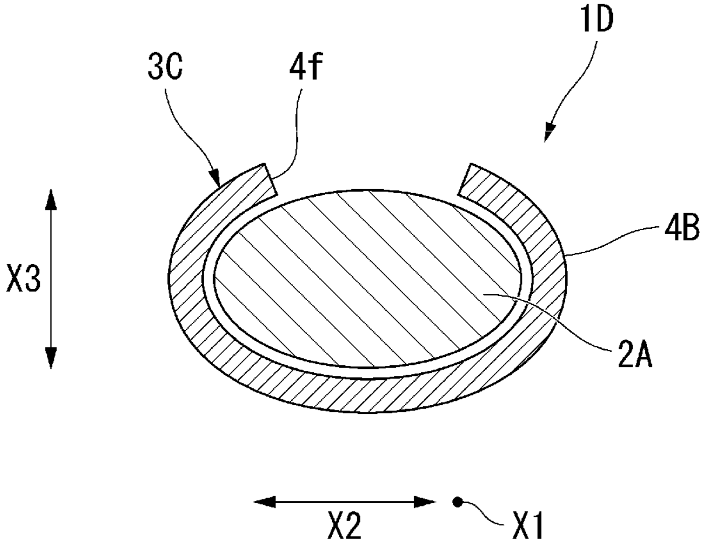
FIG. 16 is a longitudinal cross-sectional view of the weight of the support member of the lure according to the second modified example from the front-rear direction.

Next, a lure 1D according to a second modified example shown in FIG. 16 is configured by modifying the support member 3B of the above-described third embodiment and includes a support member 3C in which the cross sections of an elliptical tube 4B (guide portion, cylindrical portion) and a weight 2A are formed in an elliptical shape.

In the second modified example, the elliptical tube 4B and the weight 2A have elliptical shapes whose major axes are oriented in the left-right direction X2. An opening groove 4*f* that extends over the entire longitudinal direction is formed on the upper portion of the elliptical tube 4B. With the provision of the opening groove 4*f*, it can be expected that the movement of the weight 2A in the front-rear direction X1 will be unhindered, due to decreased friction between the elliptical tube 4B and the side wall 13, and that the movement of the weight 2A will be prevented from being hindered by the air resistance inside the elliptical tube 4B.

Fourth Embodiment

Figure 17:
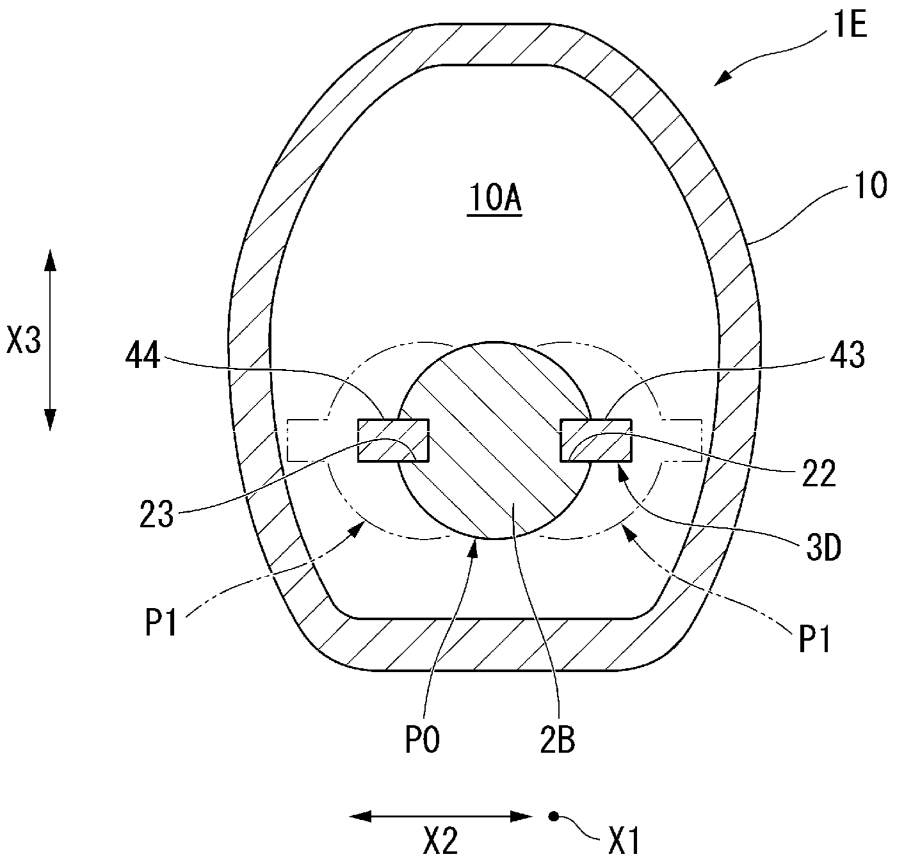
FIG. 17 is a longitudinal cross-sectional view of the support member of the lure according to a fourth modified example from the front-rear direction.
Figure 18:
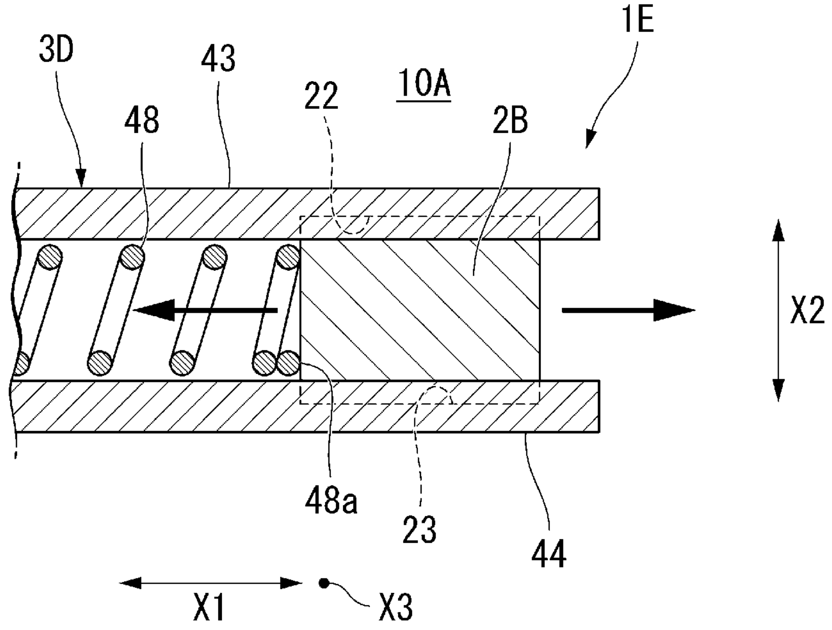
FIG. 18 is a view of the support member shown in FIG. 17 from above.

As shown in FIGS. 17 and 18, a support member 3D of a lure 1E according to a fourth embodiment is configured to have a first guide portion 43 (first shaft-shaped portion) that extends in the shape of a shaft, and a second guide portion 44 (second shaft-shaped portion) that extends in the same direction as the first guide portion 43.

In FIG. 17, the solid lines indicate the support member 3D at the initial position P0, and the chain double-dashed line indicate the support member 3D at the oscillation position P1.

The first guide portion 43 and the second guide portion 44 are arranged parallel to each other, spaced apart in the left-right direction X2. A weight 2B is sandwiched between the first guide portion 43 and the second guide portion 44 so as to be movable by being guided by the respective guide portions 43, 44. The first guide portion 43 and the second guide portion 44 are rectangular in cross section and are arranged such that the long side directions are oriented in the left-right direction X2.

The rear-end portions of the pair of first guide portion 43 and second guide portion 44 are each immovable with respect to the body 10, or movable within the range of the opening hole 14*a* (refer to FIG. 1) of the rear partition wall 14A, as in the first embodiment described above. Further, the front-end portions of pair of first guide portion 43 and second guide portion 44 are each connected to a connecting portion (not shown), either integrally or separately, as in the first embodiment or the second embodiment.

The weight 2B is cylindrical in shape. Groove portions 22, 23 (engagement portions) that engage with the first guide portion 43 and the second guide portion 44 are disposed on both the left and right sides of the weight 2B. That is, the weight 2B has a first groove portion 22 that engages the first guide portion 43 and a second groove portion 23 that engages the second guide portion 44.

As shown in FIG. 18, between the pair of the first guide portion 43 and the second guide portion 44, a spring member 48 (spring part) made of a coil spring is interposed between the weight 2B and rear-end portions (not shown) of the first guide portion 43 and the second guide portion 44. The outer diameter of the spring member 48 approximately matches the distance between the first guide portion 43 and the second guide portion 44. The weight 2B is disposed on a front-end portion 48*a* side of the spring member 48 and is biased from the rear by the biasing force of the spring member 48. The spring member 48 is held in a stopped state sandwiched between the weight 2B and the rear-end portions of the first guide portion 43 and the second guide portion 44. That is, the weight 2B is biased in the direction in which the lure 1E is being pulled by the fishing line.

The spring force (biasing force) of the spring member 48 is such that the weight 2B is easily released from its initial position and moves rearward against the biasing force by a tensile force that the body 10 receives due to the pulling motion of the fishing line.

Then, if a rearward load acts on the weight 2B, such as when the fishing line is pulled quickly, the weight 2B compresses the spring member 48 and is guided by the first guide portion 43 and the second guide portion 44.

By the lure 1E according to the fourth embodiment configured in this manner, since the structure is such that the weight 2B is guided along the first guide portion 43 and the second guide portion 44, which extend parallel to each other, the movement of the weight 2B can be stabilized.

Further, in the fourth embodiment, the first groove portion 22 and the second groove portion 23 of the weight 2B can move while being engaged with the first guide portion 43 and the second guide portion 44, respectively. Since the first guide portion 43 is configured to engage with the first groove portion 22 of the weight 2B and the second guide portion 44 is engaged with the second groove portion 23, the weight 2B can move without separating from the first guide portion 43 and the second guide portion 44. Further, in this case, since the weight 2B can be sandwiched between the first guide portion 43 and the second guide portion 44, the attitude of the weight 2B can always be maintained in a stable manner.

THIRD MODIFIED EXAMPLE

Figure 19:
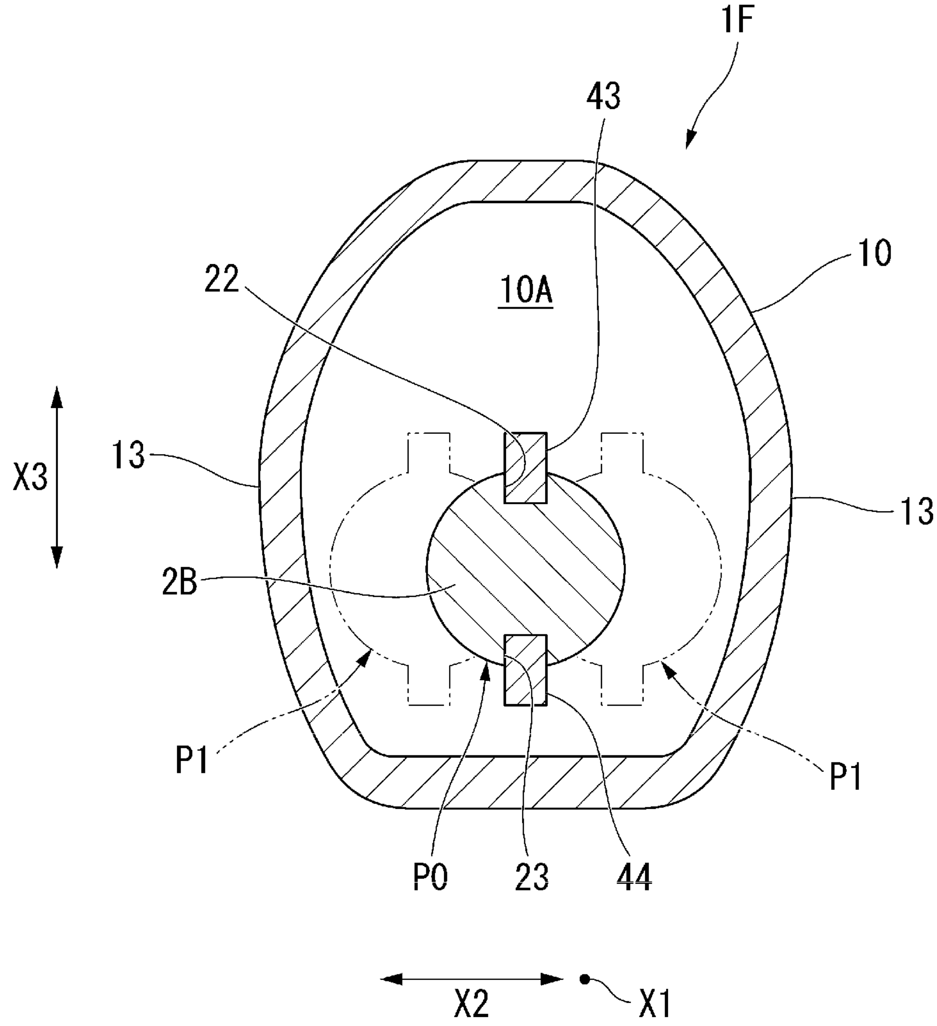
FIG. 19 is a longitudinal cross-sectional view of the support member of the lure according to the third modified example from the front-rear direction.

Next, a lure 1F according to a third modified example shown in FIG. 19 is configured such that the positions of the first guide portion 43 and the second guide portion 44 of the fourth embodiment described above are arranged to face each other in the up-down direction X3. The first guide portion 43 and the second guide portion 44 are rectangular in cross section and are arranged such that the long side directions are oriented in the up-down direction X3.

That is, the weight 2B has a first groove portion 22 that engages with the first guide portion 43 and a second groove portion 23 that engages with the second guide portion 44.

FOURTH MODIFIED EXAMPLE

Figure 20:
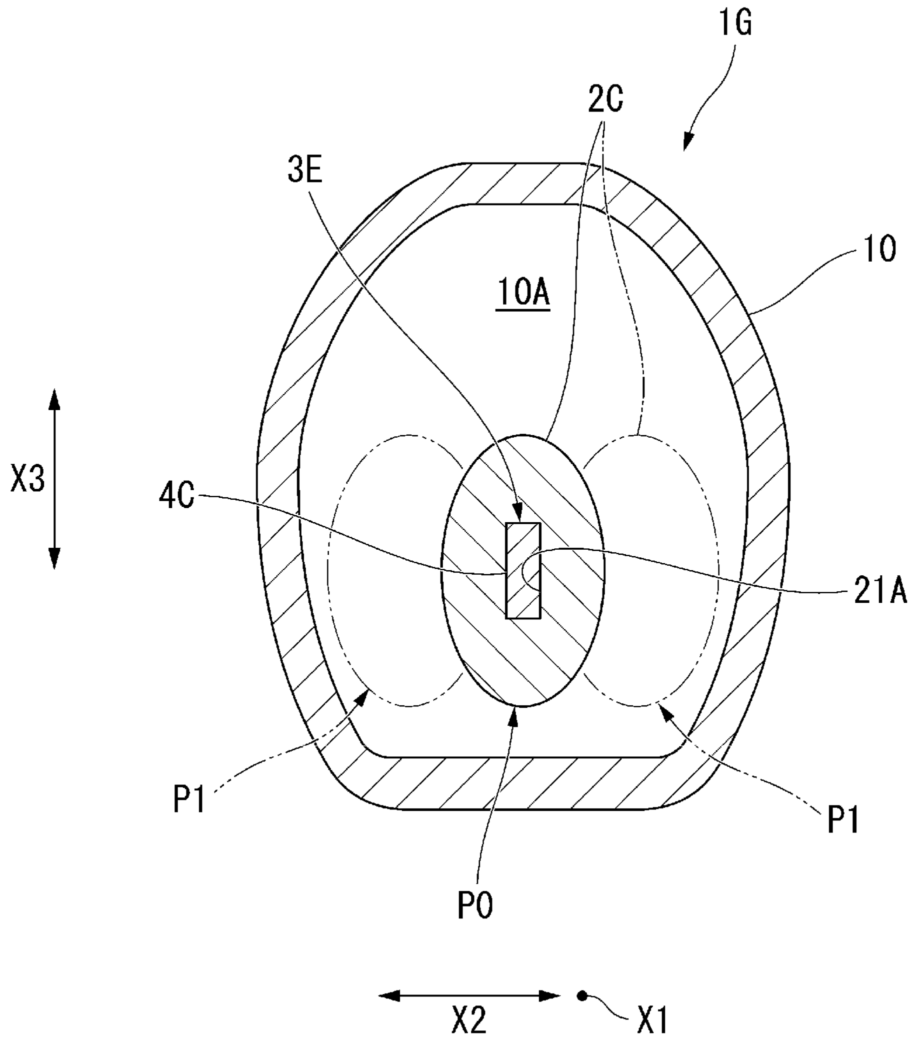
FIG. 20 is a longitudinal cross-sectional view of the support member of the lure according to the fourth modified example from the front-rear direction.

Next, a lure 1G according to a fourth modified example shown in FIG. 20 is a support member 3E obtained by modifying the support member 3 of the above-described first embodiment, in which a weight 2C has an elliptical cross section and a shaft 4C has a rectangular cross section. The weight 2C is formed in a columnar shape.

In the fourth embodiment, the weight 2C is elliptical in shape, where the long axis is oriented in the up-down direction X3, and is arranged with the long side direction of the shaft 4C oriented in the up-down direction X3. A through-hole 21A (engagement portion, hole) with a rectangular cross section into which the shaft 4C is inserted is formed at the center portion of the weight 2C.

FIFTH MODIFIED EXAMPLE

Figure 21:
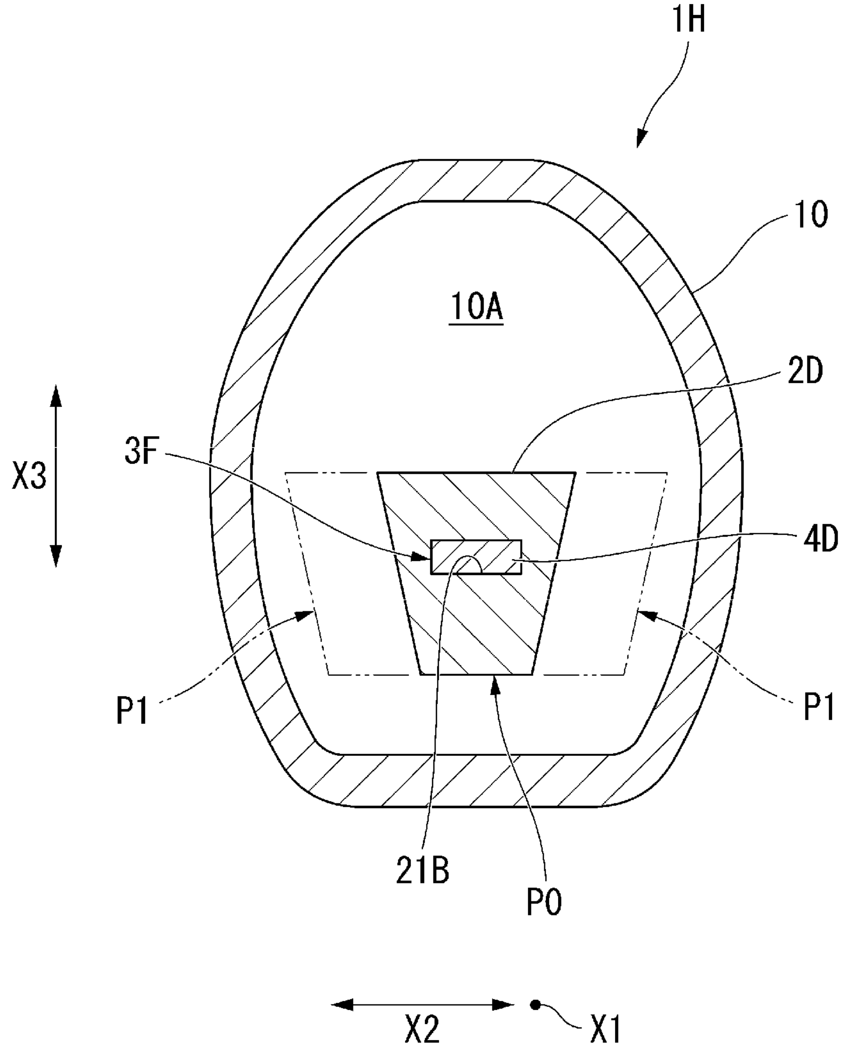
FIG. 21 is a longitudinal cross-sectional view of the support member of the lure according to a fifth modified example from the front-rear direction.

Next, a lure 1H according to a fifth modified example shown in FIG. 21 is a support member 3F obtained by modifying the support member 3 of the above-described first embodiment, where a weight 2D has a trapezoidal cross section and a shaft 4D has a rectangular cross section. The weight 2D is columnar in shape.

In the fifth embodiment, the weight 2D has a trapezoidal shape, with the long side at the top, and is arranged with the long side direction of the shaft 4D oriented in the left-right direction X2. A through-hole 21B (engagement portion, hole), rectangular in cross section, into which the shaft 4D is inserted is formed at the center portion of the weight 2D.

SIXTH MODIFIED EXAMPLE

Figure 22:
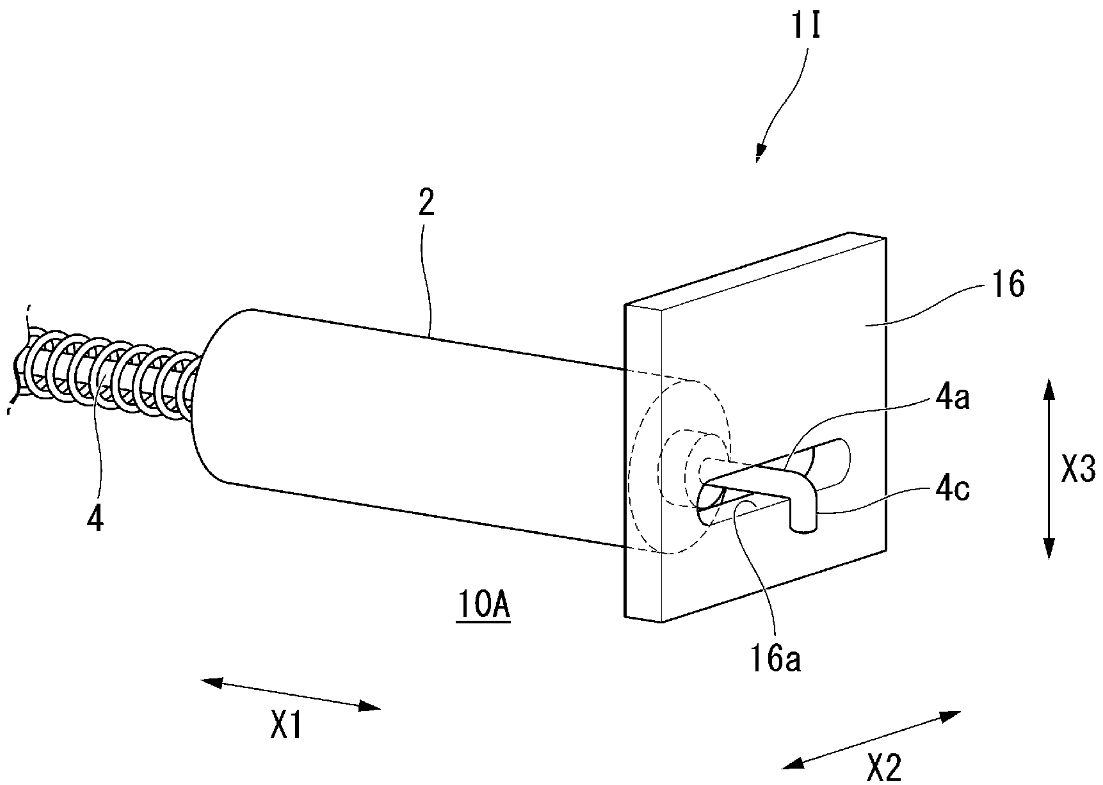
FIG. 22 is a perspective view of the support member of the lure according to a sixth modified example as seen obliquely from the front.

Next, a lure 1I according to a sixth modified example shown in FIG. 22 is configured such that the range of oscillation of the front-end portion 4*a* of the shaft 4, similar to that in the first embodiment described above, is restricted by a restricting wall 16 (restricting portion).

The restricting wall 16 is arranged with the planar direction oriented in a direction orthogonal to the front-rear direction X1 so as to partition the hollow portion 10A of the body in the front-rear direction X1 at the position of the front-end portion 4*a* of the shaft 4. The restricting wall 16 is provided with a guide groove 16*a* that extends in the left-right direction X2 and that penetrates therethrough in the thickness direction, at the same height as the shaft 4. The width dimension of the guide groove 16*a* is equivalent to the outer diameter of the shaft 4.

The shaft 4 is inserted in the guide groove 16*a* and the bent portion 4*c* at the front end projects forward from the restricting wall 16. The shaft 4 can thereby oscillate in the left-right direction X2 along the direction in which the guide groove 16*a* extends.

In the lure 1I of the sixth modified example, the range of oscillation of the shaft 4 can be restricted by adjusting the extension length of the guide groove 16*a* of the restricting wall 16.

SEVENTH MODIFIED EXAMPLE

Figure 23:
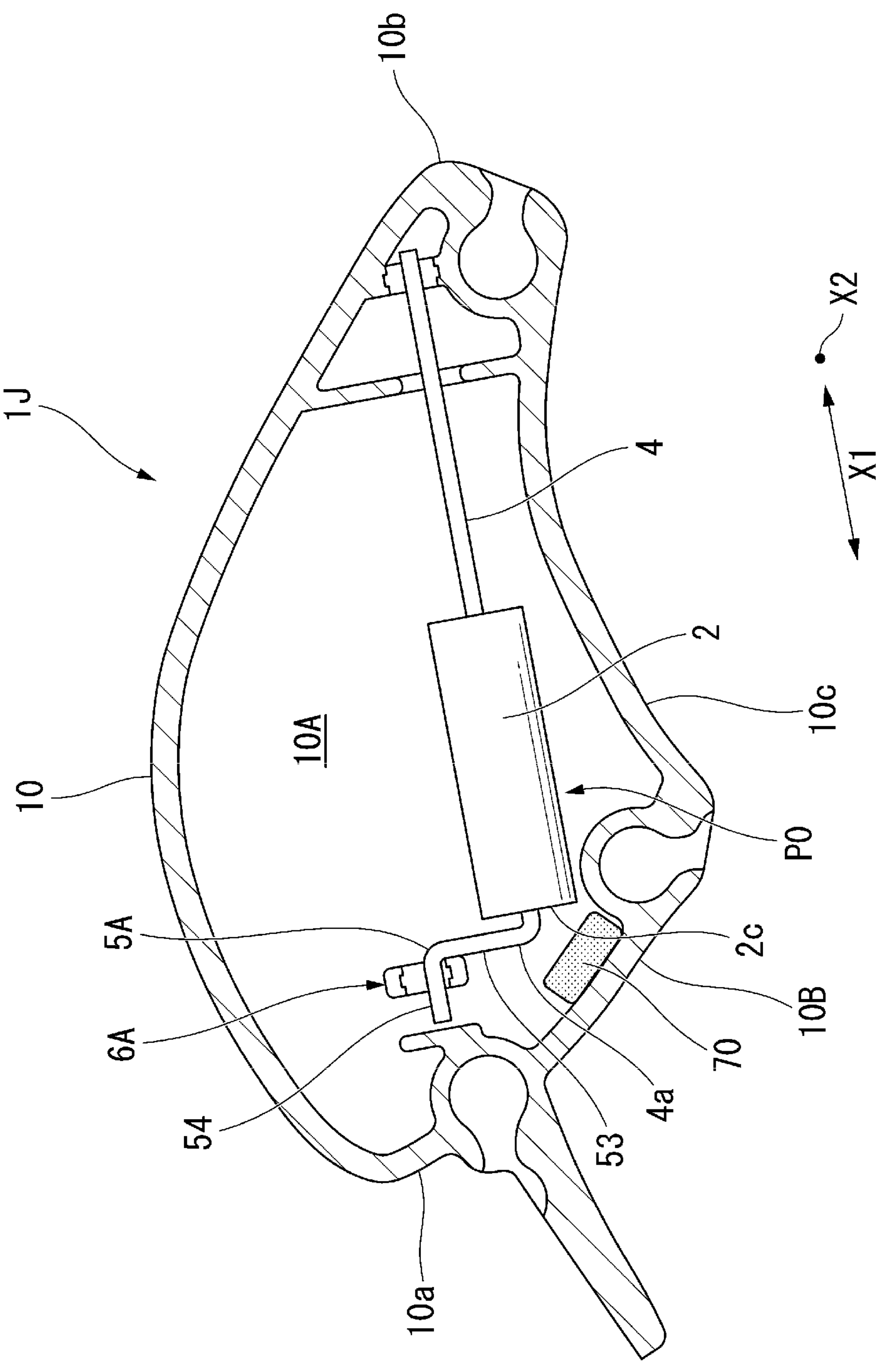
FIG. 23 is a longitudinal cross-sectional view of the lure according to a seventh modified example from the side.
Figure 24:
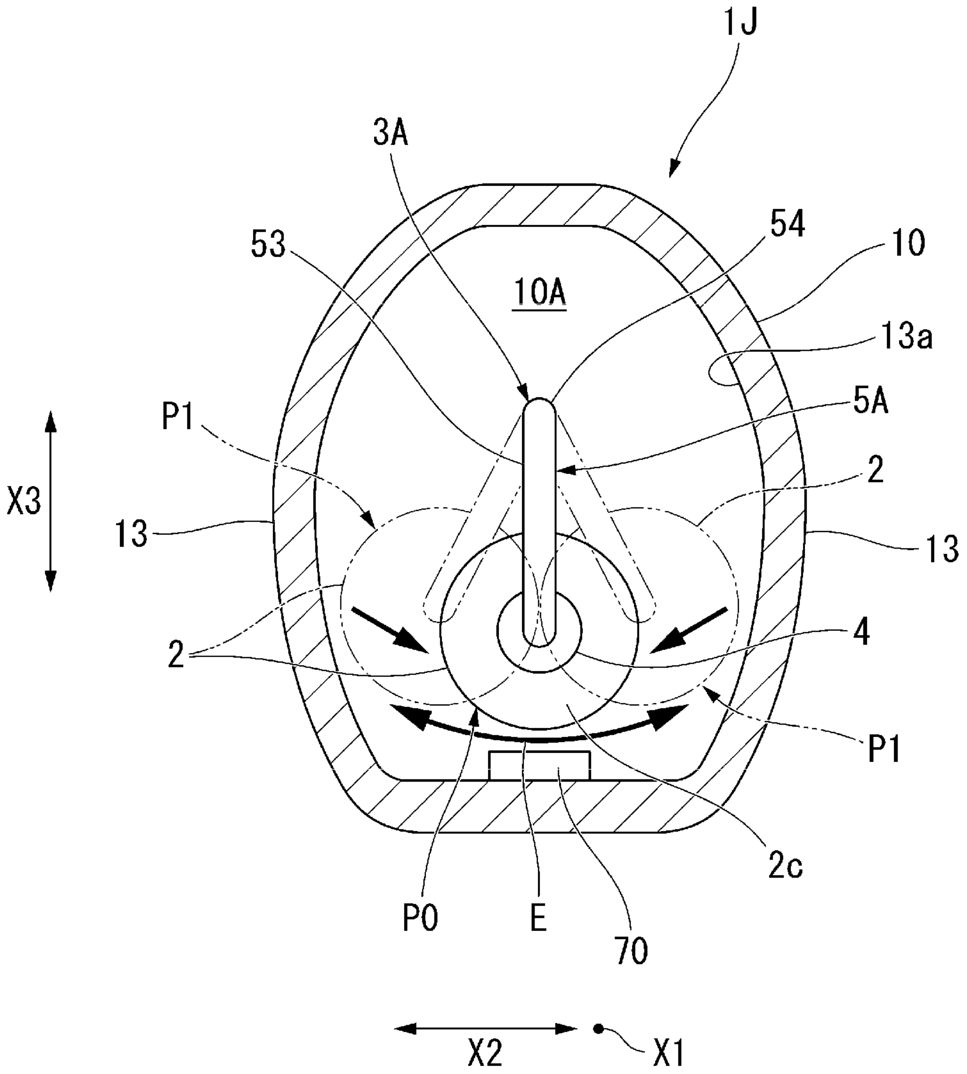
FIG. 24 is a longitudinal cross-sectional view of the lure shown in FIG. 23, from the front-rear direction.

Next, a lure 1J according to a seventh modified example shown in FIGS. 23 and 24 includes a magnet 70 (centering mechanism) that biases the weight 2, located in front of the shaft 4 of the support member 3, toward a neutral position (initial position P0) of the range of oscillation of the shaft 4.

The weight 2 is made of a magnetic body. The magnet 70 is disposed on the body 10 side and attracts the weight 2 to the initial position P0. In FIG. 23, the front-end portion 10*a* on the head side of the lure 1J is the left side of the sheet. The connecting portion 5A, which integrally includes the shaft 4 is bent approximately into the form of an L. The connecting portion 5A includes the first arm portion 53 that is connected to the front-end portion 4*a* of the shaft 4 and the second arm portion 54 that can rotate with respect to the support body 6A that is fixed to the body 10. On the front side, the body 10 has a front inclined wall 10B that is gradually inclined forward from bottom to top. The magnet 70 is fixed in a position near the weight 2 at the initial position P0 in front of the shaft 4, at the left/right central portion on the inner surface of the front inclined wall 10B on the hollow portion 10A side. That is, the magnet 70 is disposed in a position near a front-end portion 2*c* of the weight 2.

How the magnet 70 is configured, such as in terms of position, size, quantity, etc., is not limited by the description of the present seventh modified example. For example, the magnet 70 can be disposed at a lower portion 10*c* of the body 10, opposing the lower part of the weight 2 at the initial position P0.

In the lure 1J according to the seventh modified example, the oscillating weight 2 is attracted by the magnetic force of the magnet 70 and is thus biased toward the initial position P0. The support member 3, including the weight 2, is at the initial position P0, positioned such that the axial direction of the first arm portion 53 of the connecting portion 5 is oriented vertically due to its own weight. In this manner, in the lure 1J according to the seventh modified example, when the oscillating weight 2 is positioned forward, the weight 2 easily returns to the initial position P0 by the magnetic force of the magnet 70, and the support member 3, together with the weight 2, can be centered at the center in the left-right direction.

As a result, in the seventh modified example, the floating attitude of the lure 1J, which has landed on the water after casting, is improved when it tries to float up to the surface of the water or on the surface of the water, and the rising attitude is improved when the lure, on the surface of the water or in the water, begins to be pulled. In this manner, by the lure 1J of the seventh modified example, unnatural behavior, which is quite unlike that of a real fish, can be suppressed, as in the case of a tilted floating attitude or a rising attitude.

EIGHTH MODIFIED EXAMPLE

Figure 25:
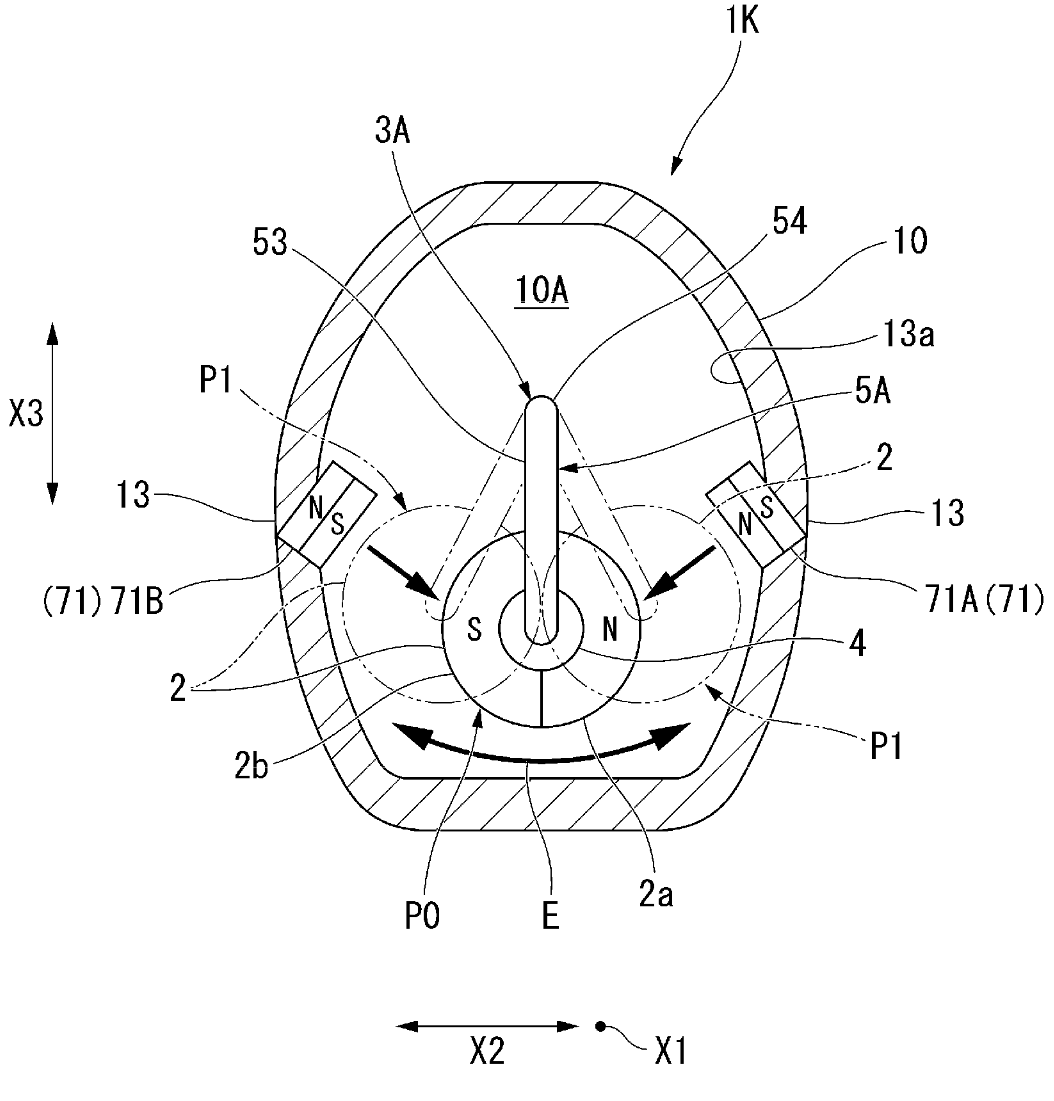
FIG. 25 is a longitudinal cross-sectional view of the lure according to an eighth modified example from the front-rear direction.

A lure 1K according to an eighth modified example shown in FIG. 25 is, like the lure 1J of the seventh modified example described above, including magnets 71 (centering mechanism) that magnetize and bias the weight 2, located in front of the shaft 4 of the support member 3, toward a neutral position (initial position P0) of the range of oscillation of the shaft 4.

The weight 2 is made of a magnetic body. In the initial position P0, a first semicircular portion 2*a* on one of left and right sides (right half in FIG. 25) of the weight 2 is magnetized as a N pole, and a second semicircular portion 2*b* on the other side (left half in FIG. 25) is magnetized as a S pole. Magnets 71A, 71B are disposed on the inner surface 13*a* of the side wall 13 such that the same poles as the N and S poles of the weight 2 are facing each other. That is, the first semicircular portion 2*a* of the weight 2 magnetized as the N pole opposes a first magnet 71A with the N pole oriented toward the hollow portion 10A side. On the other hand, the second semicircular portion 2*b* of the weight 2 magnetized as the S pole opposes a second magnet 71B with the S pole oriented toward the hollow portion 10A side.

The magnets 71 (71A, 71B) are disposed in the body 10 and bias the weight 2 to the initial position P0 by the force of repulsion. The configurations of the shaft 4 and the connecting portion 5A are the same as those of the seventh modified example. The left and right pair of magnets 71A, 71B are fixed on the inner surface 13*a* of the left and right side wall 13 of the body 10 within the range of oscillation of the weight 2 in front of the shaft 4.

In the lure 1K according to the eighth modified example, the weight 2, which oscillates due to the force of repulsion between the weight 2 and the left and right pair of magnets 71A, 71B, moves in a direction away from the left and right magnets 71A, 71B and is biased to the initial position P0. In the initial position P0, the support member 3 including the weight 2 is positioned such that the axial direction of the first arm portion 53 of the connecting portion 5 is oriented vertically due to its own weight. In this manner, in the lure 1K according to the eighth modified example, when the oscillating weight 2 is positioned forward, the weight 2 is easily returned to the initial position PO by the magnetic force of the magnets 71A, 71B, and the support member 3, together with the weight 2, can be positioned at the center in the left-right direction. As a result, in the eighth modified example, the floating attitude and the rising attitude of the lure 1K is improved.

Figure 26:
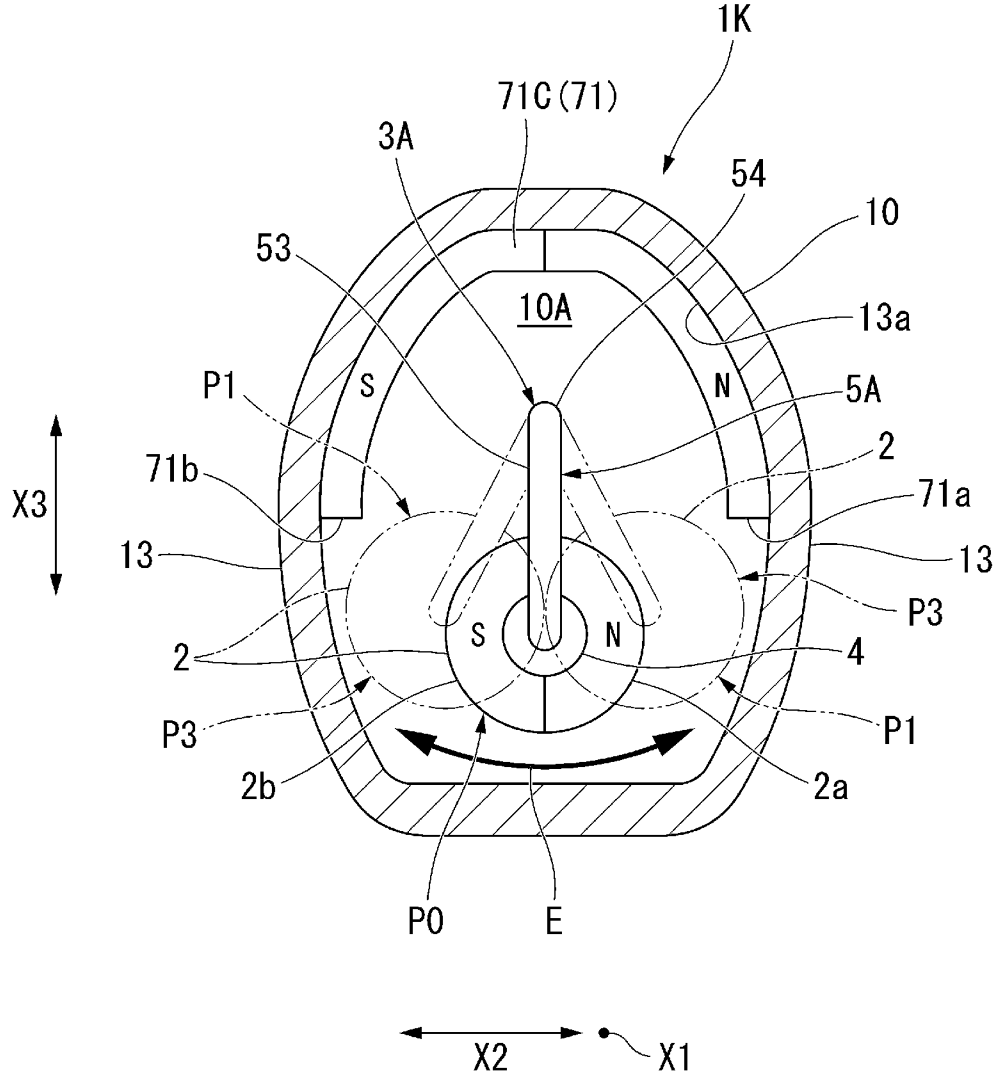
FIG. 26 is a longitudinal cross-sectional view of another lure according to the eighth modified example from the front-rear direction.

How the magnets 71 are configured, such as in terms of position, size, quantity, etc., is not limited by the description of the present eighth modified example. For example, in the lure 1K shown in FIG. 26, an arc shaped magnet 71C is fixed along the circumferential direction of the inner surface of the upper half portion of the body 10. Both circumferential ends 71*a*, 71*b* of the magnet 71C are close to the maximum oscillation positions P3 of the range of oscillation of the weight 2 in front of the shaft 4. In the magnet 71C, one first end portion 71*a* (right end portion in FIG. 26) is an N pole, and the other second end portion 71*b* (left end portion in FIG. 26) is an S pole. The first semicircular portion 2*a* of the weight 2 magnetized as the N pole opposes the first end portion 71*a* of the magnet 71C, which is the N pole. On the other hand, the second semicircular portion 2*b* of the weight 2 magnetized as the S pole opposes the second end portion 71*b* of the magnet 71C, which is the S pole. In this case as well, when the oscillating weight 2 is positioned forward, the weight 2 easily returns to the initial position PO by the magnetic force of the magnet 71C, the support member 3, together with the weight 2, can be positioned at the center in the left-right direction, and the floating attitude and the rising attitude of the lure 1K is improved.

NINTH MODIFIED EXAMPLE

Figure 27:
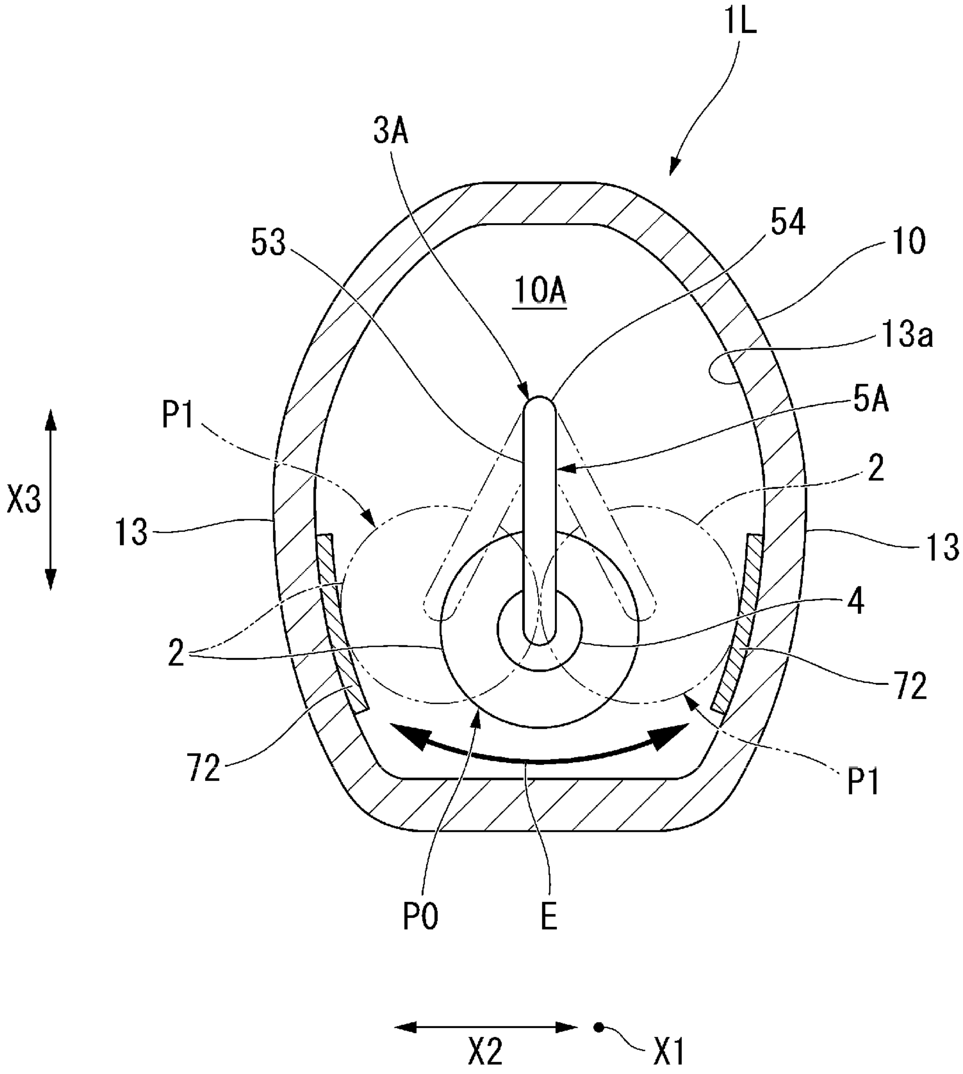
FIG. 27 is a longitudinal cross-sectional view of the lure according to a ninth modified example from the front-rear direction.

A lure 1L according to a ninth modified example shown in FIG. 27 is configured such that the weight 2 is given a rattling function (percussion sound generating member). For example, plate-like striking plates 72 made of metal are fixed on the inner surface 13*a* of the left and right side walls 13 of the body 10 within the range of oscillation of the weight 2 in front of the shaft 4. The left and right pair of striking plates 72 generate sound upon collision with the weight 2 in the oscillation position P1, and also function as protective material so that the weight 2 does not collide directly with the body 10.

Tenth Modified Example

Figure 28:
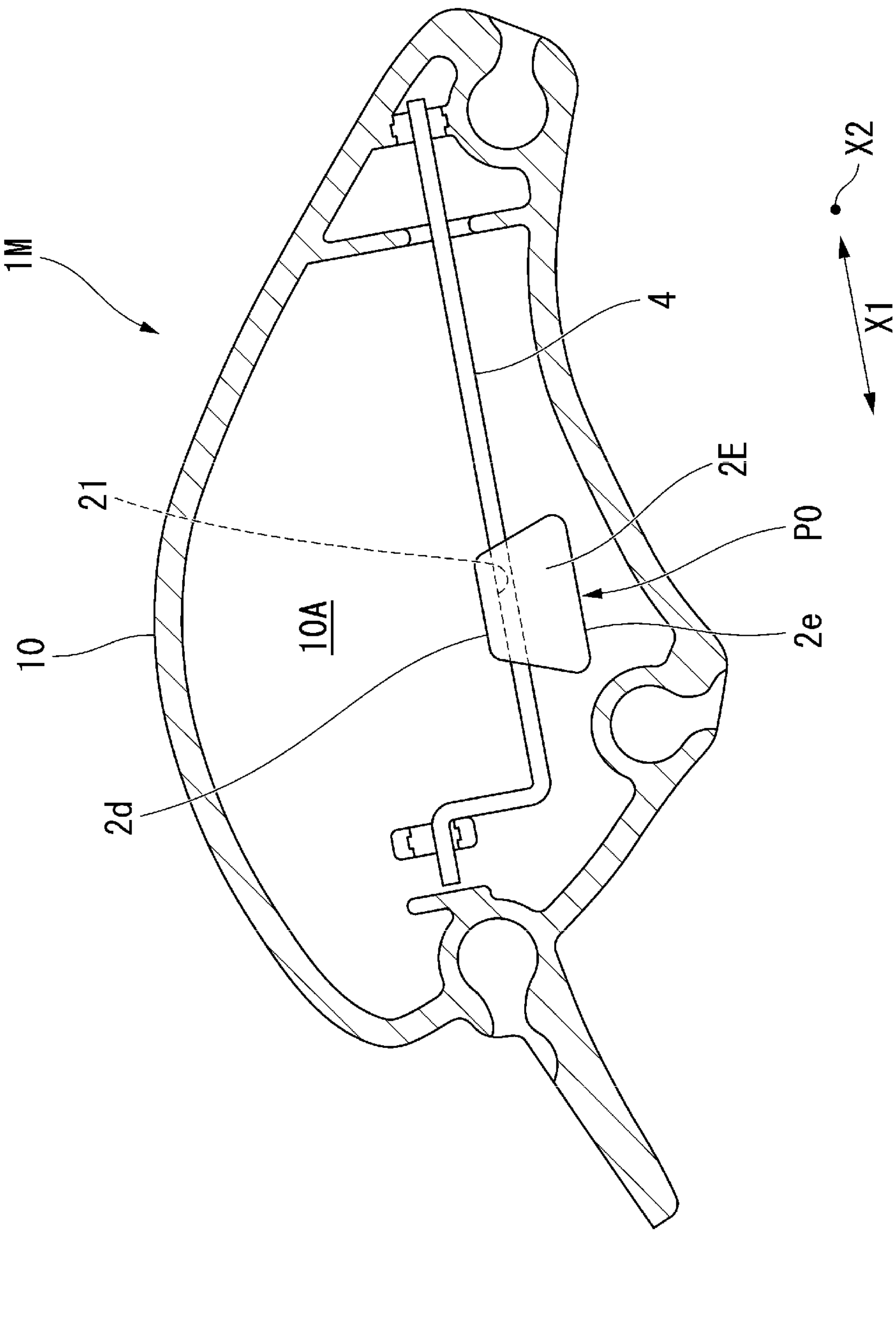
FIG. 28 is a longitudinal cross-sectional view of the lure according to a tenth modified example from the side.
Figure 29:
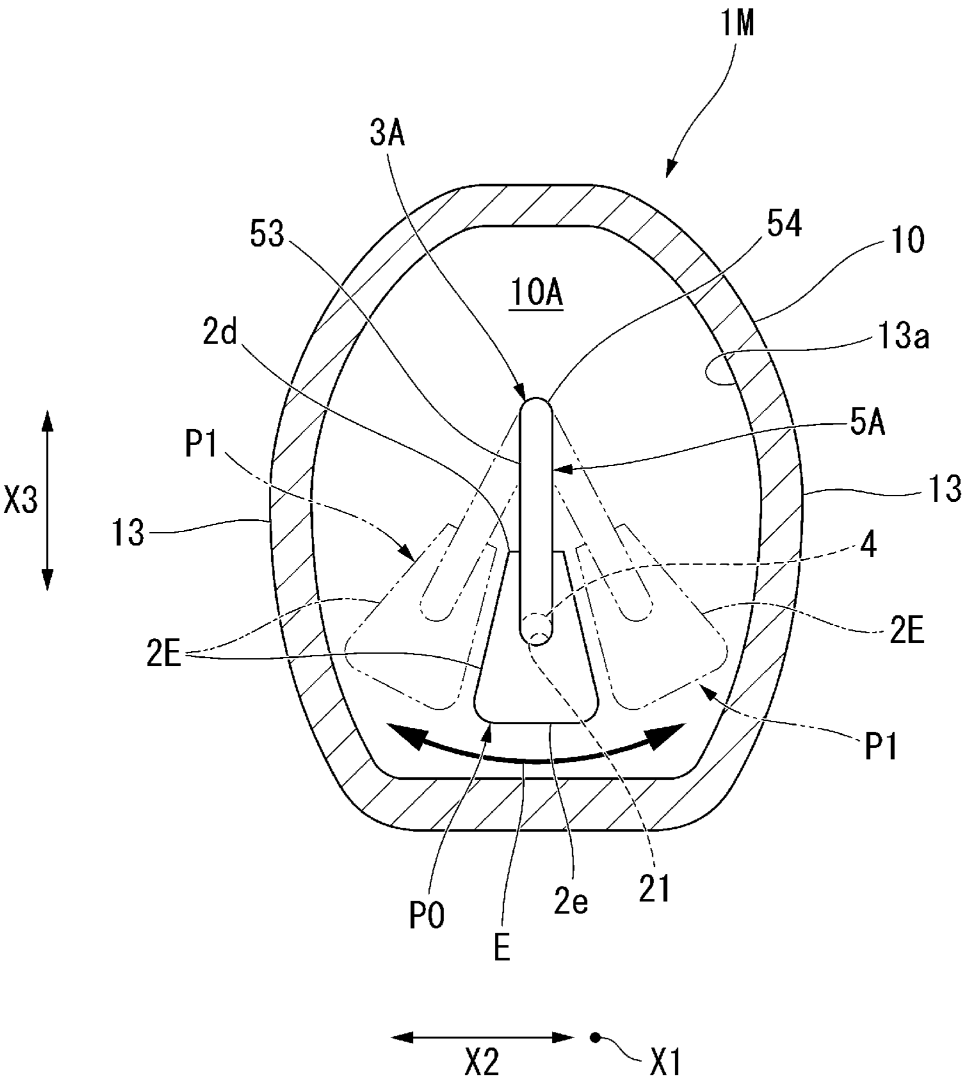
FIG. 29 is a longitudinal cross-sectional view of the lure according to the tenth modified example from the front-rear direction.
Figure 30:
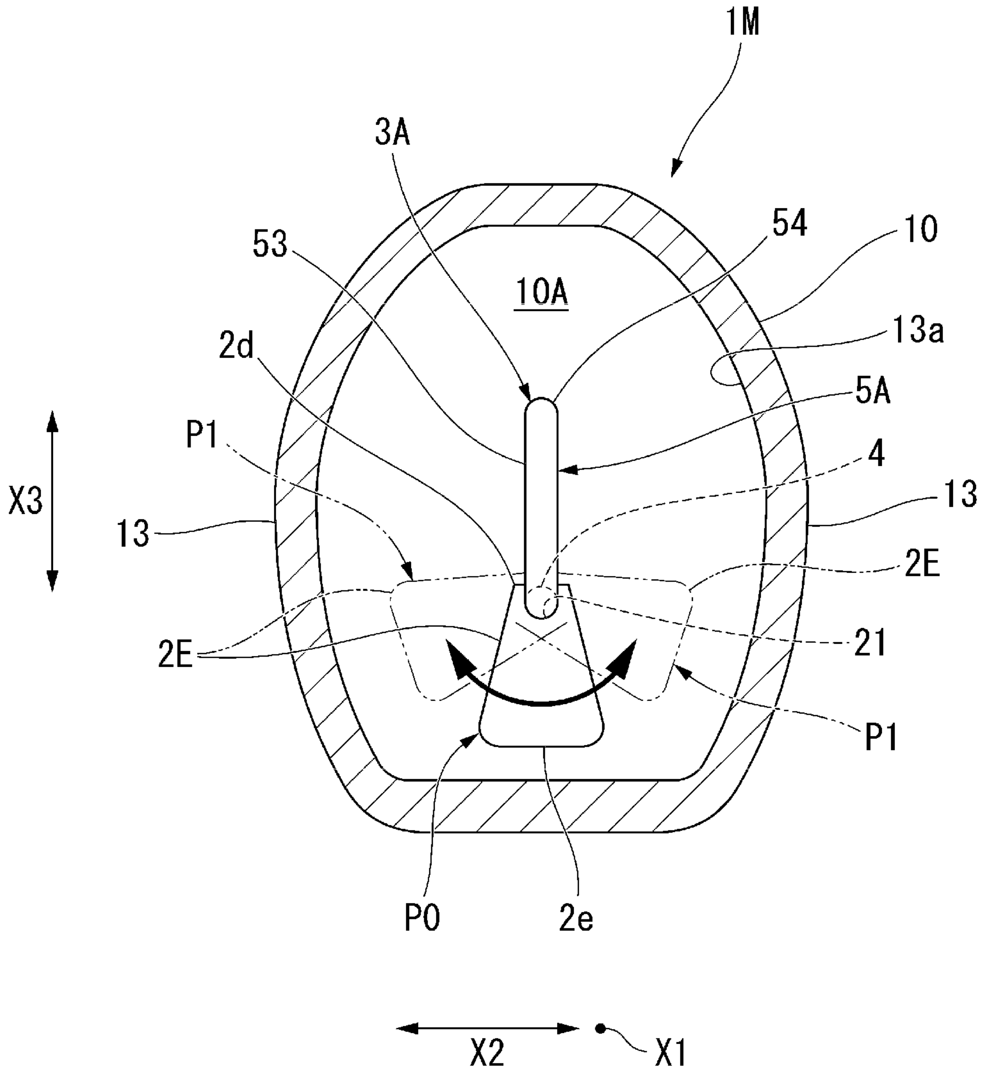
FIG. 30 is a longitudinal cross-sectional view of the lure according to the tenth modified example from the front-rear direction.

A lure 1M according to a tenth modified example shown in FIGS. 28-30 includes a weight 2E formed in an approximately trapezoidal shape as viewed from the front-rear direction X1 and the left-right direction X2, when in the attitude of the initial position P0. A through-hole 21 for insertion of the shaft 4 at an eccentric position is provided in the weight 2E. The weight 2E includes the through-hole 21 formed toward the upper portion of the weight 2E in the initial position P0 and is provided so as to be freely rotatable about the shaft 4, as shown in FIG. 30. When in the attitude of the initial position P0, the weight 2E is configured such that the length in the front-rear direction X1 increases from an inner end portion 2*d* toward an outer end portion 2*e* on the through-hole 21 side, in the side view shown in FIG. 28, and such that the length in the left-right direction X2 increases from the inner end portion 2*d* toward the outer end portion 2*e* as viewed from the front-rear direction shown in FIG. 29.

In the tenth modified example, not only does the shaft 4 oscillate, but the weight 2E itself is also configured to oscillate with respect to the shaft 4, so that the erratic movement (swimming) of the lure 1M can be increased to approximate the behavior of a real fish more closely.

ELEVENTH MODIFIED EXAMPLE

Figure 31:
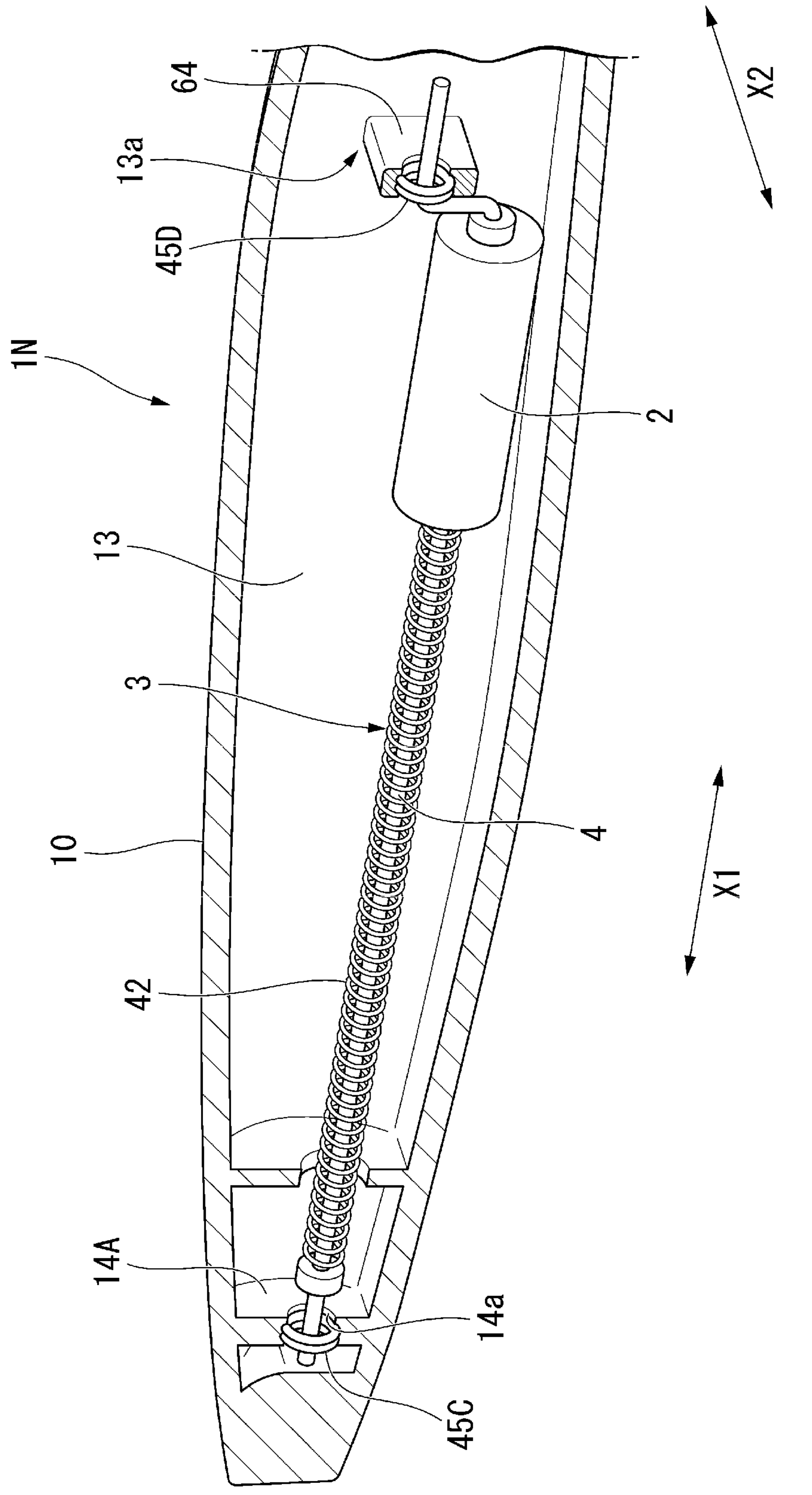
FIG. 31 is a longitudinal cross-sectional view of the internal structure of the body of the lure according to an eleventh embodiment.

A lure 1N according to an eleventh modified example shown in FIG. 31 is configured such that split rings 45C, 45D are provided instead of the metal pipe-shaped first support cylinder 45A and second support cylinder 45B (refer to FIG. 8) of the second modified example described above. In the eleventh modified example, the shaft 4 of the support member 3 is supported by the front and rear split rings 45C, 45D. The first split ring 45C on the rear side is fixed to the first opening hole 14*a* of the rear partition wall 14A. That is, the rear-end portion of the shaft 4 is supported by the rear partition wall 14A via the first split ring 45C. The second split ring 45D on the front side is fixed to the projecting fixing piece 64, which is fixed to the inner surface 13*a* of the side wall 13 of the body 10. That is, the front-end portion of the shaft 4 is supported by the projecting fixing piece 64 via the second split ring 45D.

The shaft 4 also can be given a surface treatment having low sliding ability, such as diamond-like carbon (DLC) or synthetic resin obtained by polymerizing polytetrafluoroethylene.

In the eleventh modified example, it is possible to support the shaft 4 using the first split ring 45C and the second split ring 45D to reduce the frictional resistance at the support portion of the oscillating shaft 4.

Alternatively, only one of either the front or rear support portion of the shaft 4 can be configured as a split ring.

TWELFTH MODIFIED EXAMPLE

Figure 32:
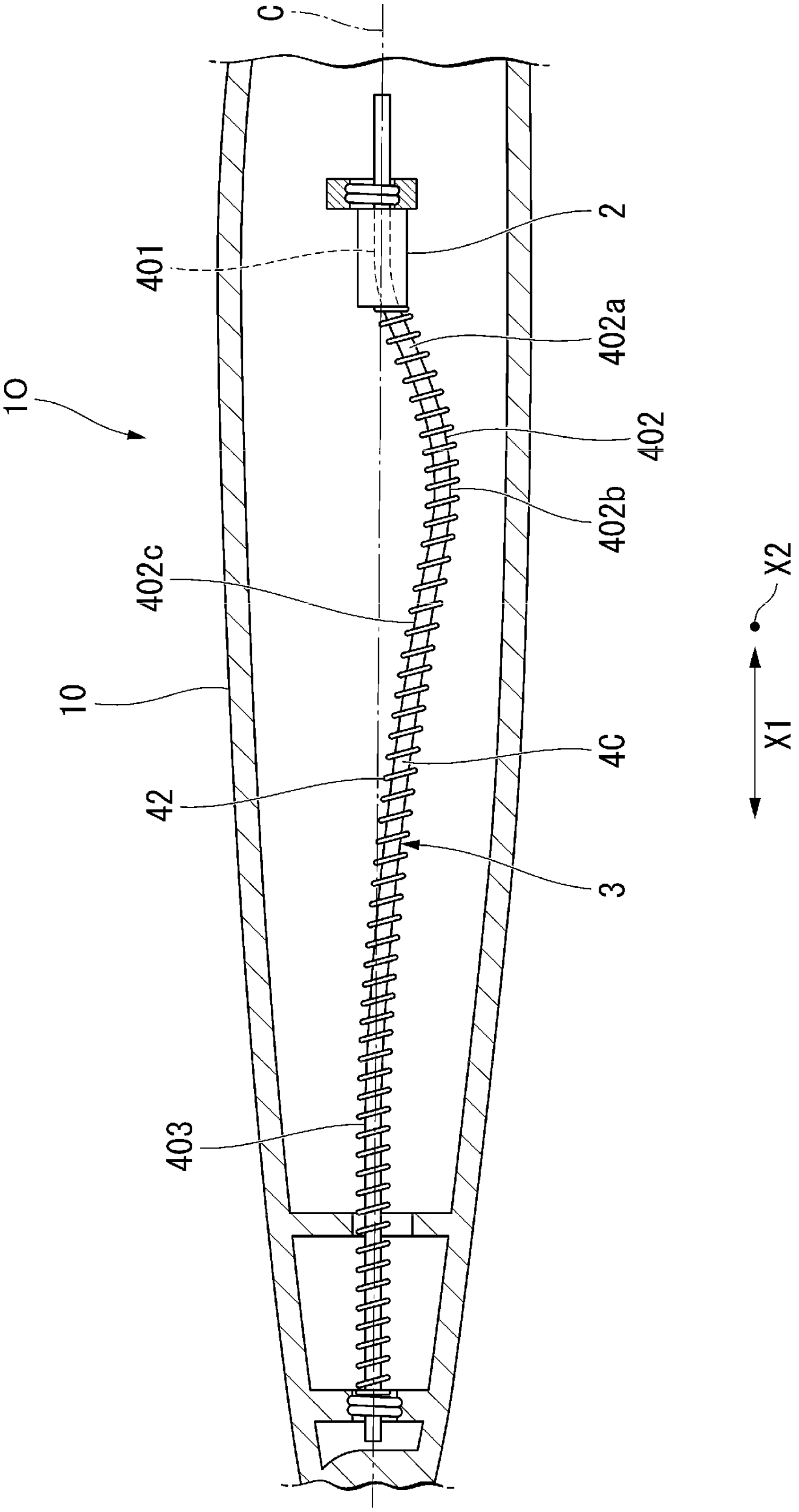
FIG. 32 is a longitudinal cross-sectional view of the lure according to a twelfth modified example from the side.
Figure 33:
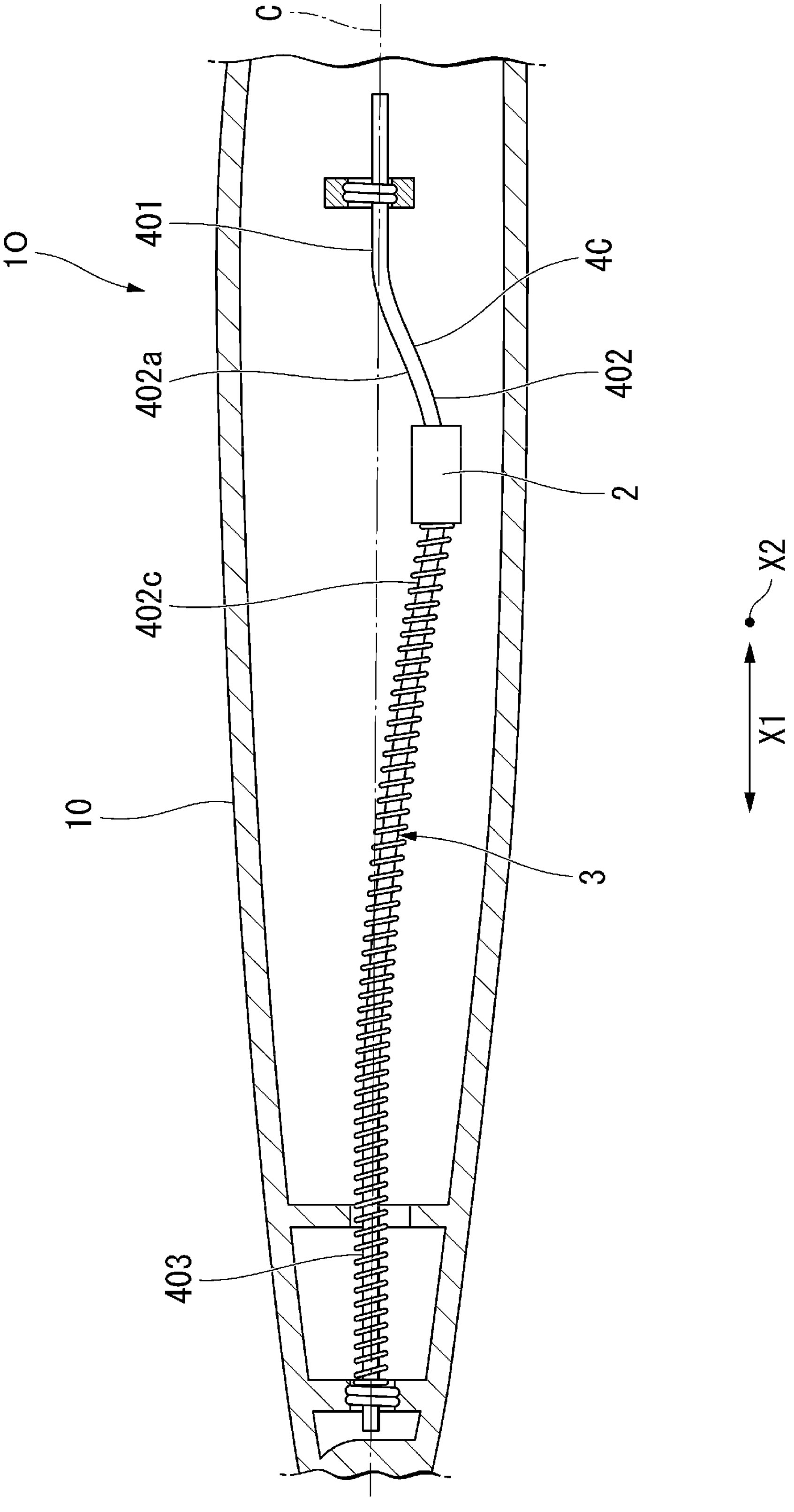
FIG. 33 is a longitudinal cross-sectional view of the lure according to the twelfth modified example from the side.

A lure 1O according to a twelfth modified example shown in FIGS. 32 and 33 employs a bent shaft 4C having a curved portion 402 on the front side. The bent shaft 4C is one example of a centering mechanism. In the bent shaft 4C, a front straight portion 401, a curved portion 402, and a rear straight portion 403 are arranged in order from the front side to the rear side. The front straight portion 401 and the rear straight portion 403 extend along the front-rear direction X1 and are supported by the body 10 positioned on the central axis of the lure 1O. That is, the front straight portion 401 and the rear straight portion 403 are always positioned on a central axis C of the lure 1O even when the bent shaft 4C oscillates. The axial lengths of the front straight portion 401 and the rear straight portion 403 are at least longer than the length of the weight 2. The curved portion 402 is curved downward when in the attitude of the initial position P0 shown in FIG. 32. Specifically, the curved portion 402 has a downward curved portion 402*a* that is curved downward from the front straight portion 401 toward the rear, and an upward curved portion 402*c* that passes through a lowermost portion 402*b* and curves upward toward the rear straight portion 403. The downward curved portion 402*a* has a tighter curve than the upward curved portion 402*c*.

In the twelfth modified example, when the lure 1O is pulled and placed in a swimming attitude, as shown in FIG. 33, the weight 2 moves to the curved portion 402 of the bent shaft 4C due to inertia, and the weight 2 oscillates; thus, the uncertainty of the movement (swimming) of the lure 1 can be increased to approximate the behavior of a real fish more closely.

Further, as shown in FIG. 32, the lure 1O according to the twelfth modified example, in a state in which the weight 2 is returned to the front straight portion 401 of the bent shaft 4C by the spring member 42, only the curved portion 402 oscillates even if the bent shaft 4C rotates about the central axis C, and the front straight portion 401 becomes coaxial with the central axis C. That is, in the twelfth modified example, since the bent shaft 4C of the support member 3, together with the weight 2, can be centered in the center in the left-right direction, the floating attitude and the rising attitude of the lure 1O is improved.

The above-described embodiments of the lure according to the disclosure are presented as examples and are not intended to limit the scope of the disclosure. The embodiments can be implemented in a variety of other forms; furthermore, various omissions, substitutions and changes can be made without departing from the essence of the disclosure. Embodiments and modifications include those that can be easily conceived of by a person skilled in the art, those that are essentially the same, and those that are of equivalent scope.

For example, in the embodiments described above, the shape of the weight 2 may be cylindrical or prismatic.

Further, the shape, form, quantity, and other aspects of the weights, support members (guide portions, connecting portions), or the support bodies shown in the present embodiments can be set arbitrarily in accordance with the shape of the lure body or conditions such as the range of oscillation, the method of oscillation, and the like.

THIRTEENTH MODIFIED EXAMPLE

Figure 34:
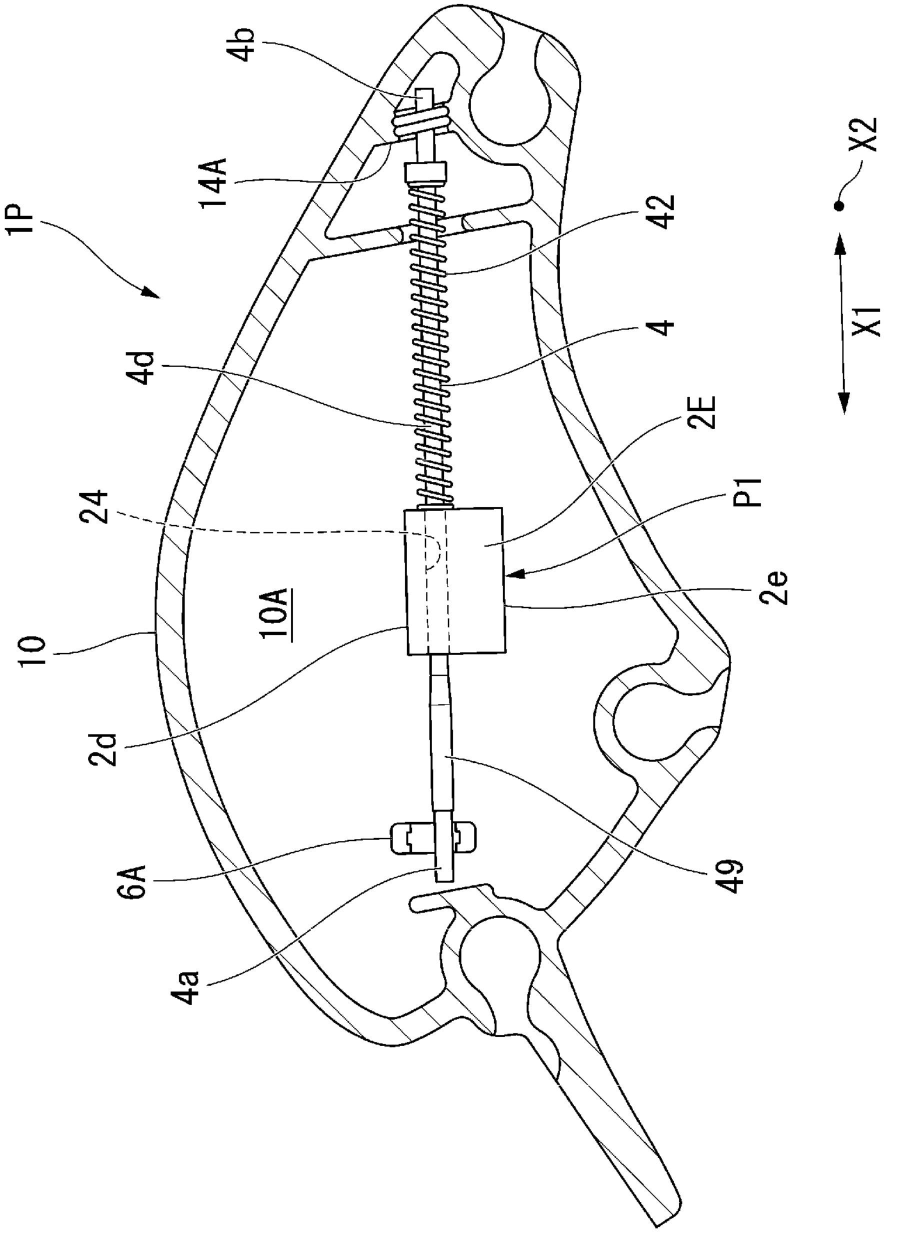
FIG. 34 is a longitudinal cross-sectional view of the lure according to a thirteenth modified example from the side.

A lure 1P according to a thirteenth modified example shown in FIG. 34 comprises the body 10 having the hollow portion 10A inside, a shaft 4 that extends in a longitudinal direction X1 of the body 10 in the hollow portion 10A, and a weight 2E that can move along the shaft 4 and that can oscillate about the axis of the shaft 4. The head side of the lure 1P is the left side of the paper of FIG. 34. A centering mechanism that positions the weight 2E in a neutral position of the range of oscillation of the weight 2E is also provided. The shaft 4 is formed in a straight line with the longitudinal direction to be arranged essentially along the front-rear direction X1, a front-end portion 4*a* of the shaft 4 is supported by a support body 6A that is fixed to a front side of the interior of the body 10, and the rear-end portion 4*b* of the shaft 4 is supported by a rear partition wall 14A.

Figure 35:
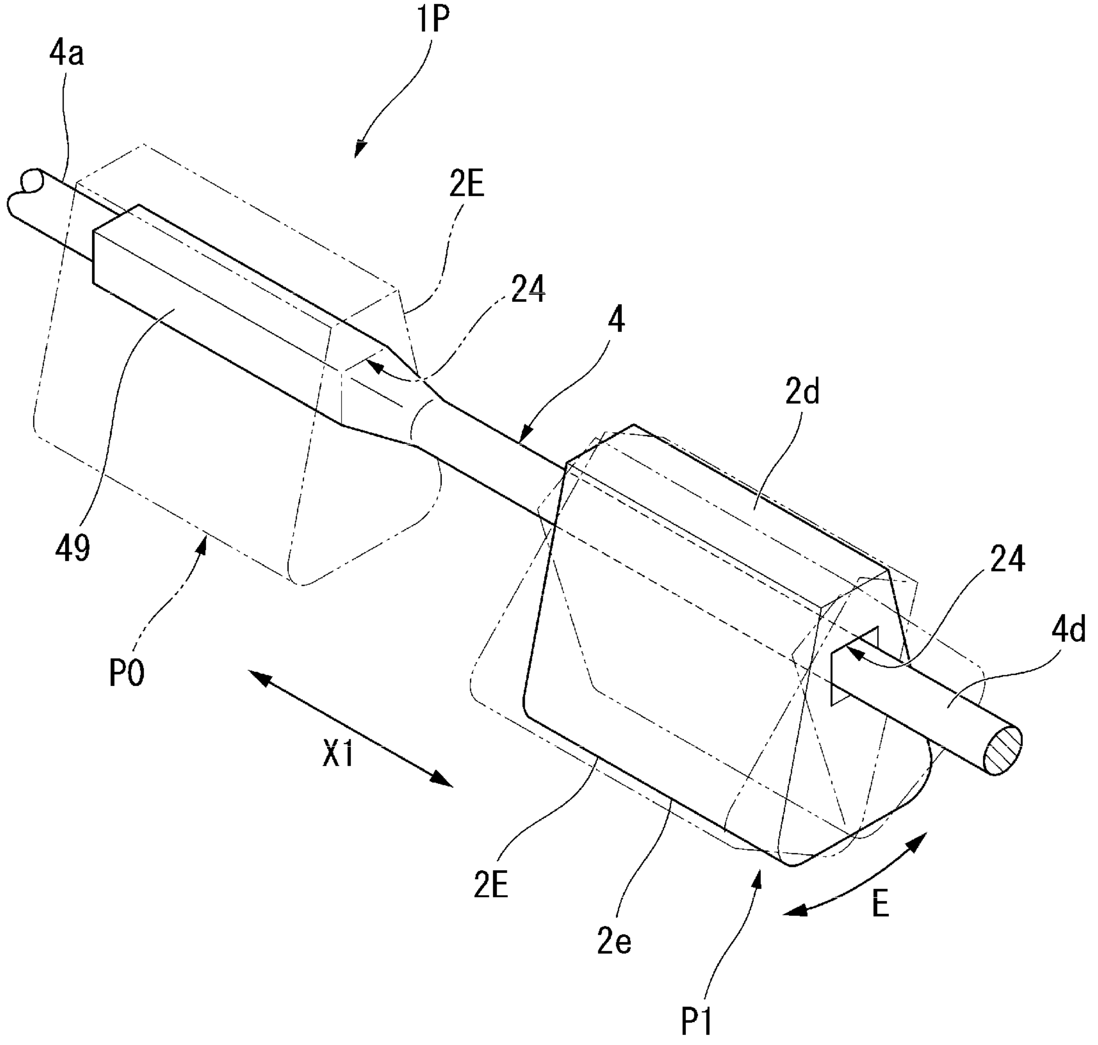
FIG. 35 is a perspective view of the configuration of the shaft and the weight shown in FIG. 34 as seen obliquely from the rear.

As shown in FIG. 35, the centering mechanism of the lure 1P includes a non-circular through-hole 24 (through-hole) formed in the weight 2E, through which the shaft 4 is inserted at an eccentric position, and a non-circular portion 49 that is formed on the shaft 4 and that engages the non-circular through-hole 24 of the weight 2E at the front-end portion 4*a* in the axial direction. The weight 2E has a trapezoidal cross-sectional shape, with the inner end portion 2*d* having a smaller width than the outer end portion 2*e*. The non-circular through-hole 24 of the weight 2E has a square cross-sectional shape and is formed in a position near the inner end portion 2*d*. The non-circular portion 49 formed at the front-end portion 4*a* of the shaft 4 has a square cross-sectional shape that is the same size or slightly larger than that of the non-circular through-hole 24. A circular cross-sectional portion 4*d* of the shaft 4, excluding the non-circular portion 49, has a circular cross-sectional shape.

The centering mechanism is configured so that when the non-circular portion 49 and the non-circular through-hole 24 are engaged, the weight 2E becomes the center of oscillation and cannot oscillate. That is, the weight 2E is at an oscillation position P1 at the position of the circular cross-sectional portion 4*d* of the shaft 4 and can oscillate (oscillate direction E) about the axis of the shaft 4. Then, at the position in which the non-circular through-hole 24 of the weight 2E engages the non-circular portion 49 of the shaft 4, the oscillation of the weight 2E is restricted, and the weight 2E is positioned at the center of oscillation (initial position P0).

In this manner, by the lure 1P of the thirteenth invention, when the lure 1P is pulled and placed in a swimming attitude, the weight 2E moves to the rear side of the shaft 4 due to inertia, and the weight 2E, which is eccentric with respect to the shaft 4, oscillates, thereby increasing the uncertainty of the movement (swimming) of the lure 1P and making the behavior of the lure more closely resemble that of a real fish. Then, when the pulling of the lure 1P is stopped and the weight 2E is positioned at the front-end portion 4*a* of the shaft 4, the non-circular through-hole 24 of the weight 2E engages the non-circular portion of the shaft, and the rotation of the weight with respect to the shaft 4 is restricted. As a result, the weight 2E can be centered in the center of the range of oscillation, and the floating attitude and the rising attitude of the lure 1P is improved.

In addition, in the thirteenth modified example, as shown in FIG. 34, a spring member 42 (biasing member) that biases the weight 2E toward the front side of the shaft 4 is provided.

That is, since the weight 2E is biased toward the front by the spring member 42, when the lure 1P is pulled, the weight 2E can be moved to a position where the weight can oscillate at a rear side (pulling direction of the lure 1P) against the biasing force of the spring member 42, thereby placing the lure 1P in a swimming attitude. When the tensile force of the lure 1P is less than the biasing force of the spring member 42, the weight 2E, which is in a position to be able to oscillate (oscillation position P1) by means of the biasing force of the spring member 42, then moves to the non-circular portion 49 of the shaft 4 on the front side and engages therewith, so that the weight 2E can be positioned at a neutral position (initial position P0) of the range of oscillation.

In the thirteenth embodiment, the configuration in which the spring member 42 is provided is not essential and can be omitted.

FOURTEENTH MODIFIED EXAMPLE

Figure 36:
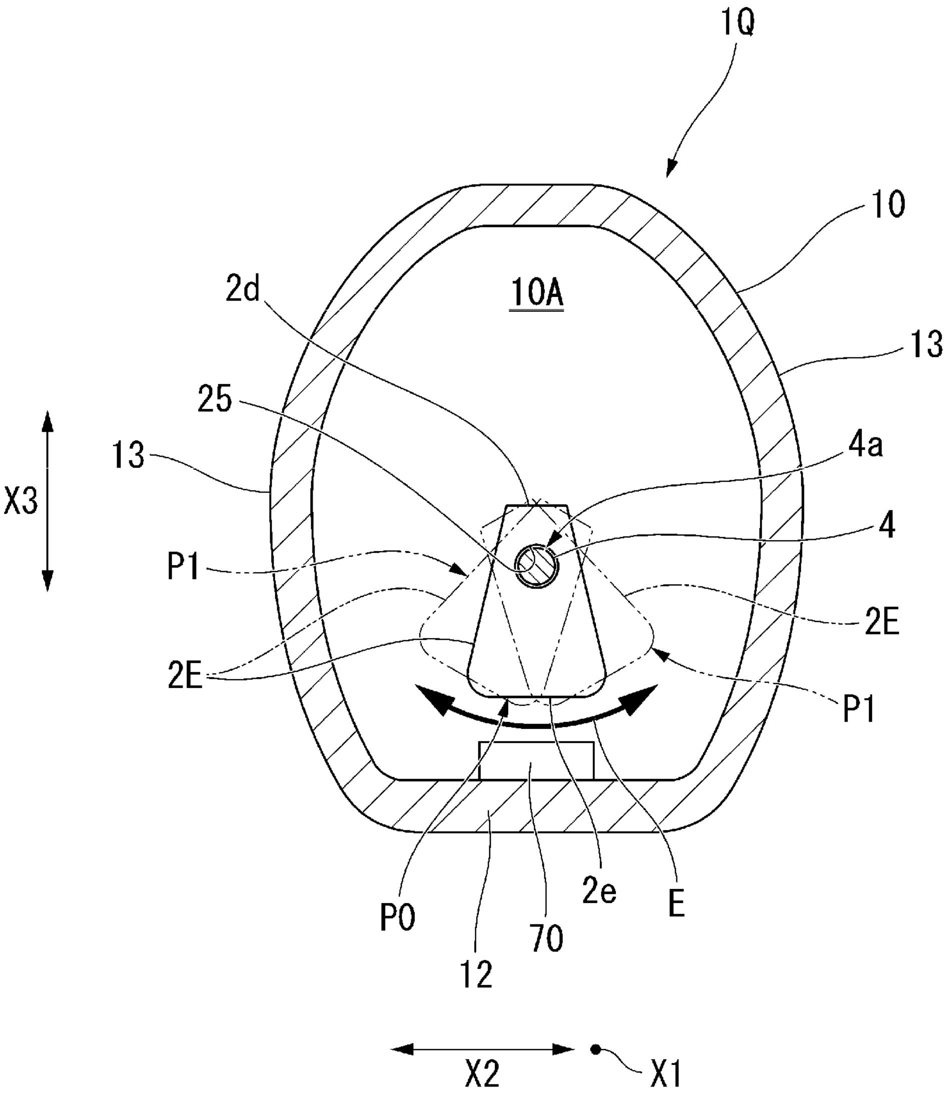
FIG. 36 is a longitudinal cross-sectional view of the lure according to a fourteenth modified example as seen from the side.

In a lure 1Q according to the fourteenth modified example shown in FIG. 36, the non-circular portion 49 of the shaft 4 in the thirteenth modified example described above is omitted and the entire axial direction has a circular cross section, and a through-hole 25 of the weight 2E is also formed with a circular cross section having the same diameter as the shaft 4. That is, the weight 2E is provided so as to be able to oscillate in the direction of arrow E at any position in the entire axial direction of the shaft 4.

In addition, the weight 2E is formed from a magnetic material. The centering mechanism of the lure 1Q is a magnet 70 disposed at a position on the lower wall 12 of the body 10 facing the front-end portion 4*a* of the shaft 4 and attracts the weight 2E at a neutral position (initial position P0). The position of the magnet 70 is not limited to the lower wall 12 and can be on the side wall 13, for example.

In the fourteenth modified example, when pulling of the lure 1Q is stopped and the weight 2E is positioned at the front-end portion 4*a* of the shaft 4, the weight 2E, which is formed from a magnetic material, is attracted by the magnet 70 to a neutral position (initial position P0), and the rotation of the weight 2E with respect to the shaft 4 is restricted. As a result, the weight 2E can be centered in the center of the range of oscillation, and the floating attitude and the rising attitude of the lure 1Q is improved.

What is claimed is:

1. A lure, comprising:

a body having an interior hollow portion;

a weight configured to move toward a tail side in the hollow portion;

a support member having a guide portion extending in a longitudinal direction of the body so as to guide the weight while the weight is moving in the longitudinal direction and capable of oscillating inside the hollow portion; and a spring part configured to bias the weight toward a front side of the support member.

2. The lure according to claim 1, wherein the body includes a restricting portion configured to restrict a range of oscillation of the support member.

3. The lure according to claim 1, wherein the support member is configured to oscillate in a plane intersecting the longitudinal direction.

4. The lure according to claim 1, wherein at least one end of the support member is connected to an inner surface of the body.

5. The lure according to claim 1, wherein the support member includes a connecting portion connecting the guide portion to the body so as to be capable of oscillating.

6. The lure according to claim 5, wherein the connecting portion is integral with the guide portion.

7. The guide lure according to claim 1, wherein the guide portion has a first shaft-shaped portion extending in the shape of a shaft.

8. The lure according to claim 7, wherein the guide portion further includes a second shaft-shaped portion extending in a same direction as the first shaft-shaped portion.

9. The lure according to claim 7, wherein the weight has an engagement portion configured to engage the guide portion, and the engagement portion has a first groove portion configured to engage the first shaft-shaped portion.

10. The lure according to claim 8, wherein the weight has an engagement portion configured to engage the guide portion, and the engagement portion has a first groove portion configured to engage the first shaft-shaped portion and a second groove portion configured to engage the second shaft-shaped portion.

11. The lure according to claim 1, wherein the guide portion includes a housing portion that houses the weight so as to be movable.

12. The lure according to claim 11, wherein the guide portion has a cylindrical portion that includes the housing portion and that extends in a direction of movement of the weight.

13. The lure according to claim 1, wherein the weight has an engagement portion configured to engage the guide portion.

14. The lure according to claim 1, wherein the weight is formed in a columnar shape.

15. The lure according to claim 14, wherein the weight is formed in a cylindrical shape.

16. The lure according to claim 14, wherein the weight has a hole into which the guide portion is inserted.

17. The lure according to claim 16, wherein the hole passes through a center of the cross section of a weight.

18. The lure according to claim 1, wherein a centering mechanism configured to bias the weight is positioned in front of a shaft of the support member and is disposed at a neutral position of a range of oscillation of the support member.

19. The lure according to claim 18, wherein the weight is a magnetic material, and the centering mechanism is a magnet disposed on a body side and is configured to attract the weight at the neutral position.

20. The lure according to claim 1, wherein the support member is configured to be disposed inside the spring part.

* * * * *